United States Patent
Gandhi

(10) Patent No.: US 9,066,385 B2
(45) Date of Patent: Jun. 23, 2015

(54) CONTROL SYSTEM FOR COLOR LIGHTS

(76) Inventor: Samir Gandhi, Simi Valley, CA (US)

( * ) Notice: Subject to any disclaimer, the term of this patent is extended or adjusted under 35 U.S.C. 154(b) by 416 days.

(21) Appl. No.: 13/465,619

(22) Filed: May 7, 2012

(65) Prior Publication Data

US 2012/0323394 A1 Dec. 20, 2012

Related U.S. Application Data

(63) Continuation of application No. PCT/US2009/069938, filed on Dec. 31, 2009.

(51) Int. Cl.
*G06F 19/00* (2011.01)
*H05B 37/02* (2006.01)
*H04N 1/00* (2006.01)
*H05B 33/08* (2006.01)

(52) U.S. Cl.
CPC ........... *H05B 37/029* (2013.01); *H04N 1/0097* (2013.01); *H05B 33/0857* (2013.01)

(58) Field of Classification Search
USPC ................ 700/197, 2; 315/86, 151, 160, 186; 368/72, 131
See application file for complete search history.

(56) References Cited

U.S. PATENT DOCUMENTS

| | | | |
|---|---|---|---|
| 4,317,071 A | 2/1982 | Murad | |
| 5,097,183 A | 3/1992 | Vila-Masot et al. | |
| 5,420,482 A | 5/1995 | Phares | |
| 5,763,964 A | 6/1998 | Rotta | |
| 6,016,038 A | 1/2000 | Mueller et al. | |
| 6,150,774 A | 11/2000 | Mueller et al. | |
| 6,211,626 B1 | 4/2001 | Lys et al. | |
| 6,292,901 B1 | 9/2001 | Lys et al. | |
| 6,340,868 B1 | 1/2002 | Lys et al. | |
| 6,348,766 B1 | 2/2002 | Ohishi et al. | |
| 6,528,954 B1 | 3/2003 | Lys et al. | |
| 6,577,080 B2 * | 6/2003 | Lys et al. | 315/362 |
| 6,801,003 B2 | 10/2004 | Schanberger et al. | |
| 6,806,659 B1 | 10/2004 | Mueller et al. | |
| 7,038,399 B2 | 5/2006 | Lys et al. | |
| 7,106,378 B2 | 9/2006 | Kawakami | |
| 7,180,252 B2 | 2/2007 | Lys et al. | |
| 7,186,000 B2 | 3/2007 | Lebens et al. | |
| 7,186,003 B2 | 3/2007 | Dowling et al. | |
| 7,646,029 B2 * | 1/2010 | Mueller et al. | 257/84 |
| 2002/0047628 A1 | 4/2002 | Morgan et al. | |
| 2002/0071279 A1 | 6/2002 | Katogi et al. | |
| 2002/0113555 A1 * | 8/2002 | Lys et al. | 315/149 |
| 2004/0207334 A1 | 10/2004 | Lin | |
| 2005/0128751 A1 * | 6/2005 | Roberge et al. | 362/276 |
| 2005/0174473 A1 | 8/2005 | Morgan et al. | |
| 2005/0264973 A1 * | 12/2005 | Gardner et al. | 361/169.1 |

(Continued)

OTHER PUBLICATIONS

International Search Report for Serial No. PCT/US2009/069938 mailed Sep. 16, 2010.

(Continued)

*Primary Examiner* — Kidest Bahta
(74) *Attorney, Agent, or Firm* — Brooks Acordia IP Law, PC; Pejman Yedidsion

(57) ABSTRACT

One or more LED light array circuits are set to a display pattern via modulating the current via a microcontroller. A microcontroller master effects the lighting patterns by communicating display pattern settings to a plurality of slaved LED light array circuits via DC power lines and fixtures thereof.

19 Claims, 33 Drawing Sheets

(56) References Cited

U.S. PATENT DOCUMENTS

2006/0262544 A1 11/2006 Piepgras et al.
2008/0234203 A1* 9/2008 Reinheimer et al. ............ 514/15

OTHER PUBLICATIONS

Xiaohui Qu et al., Color Control System for RGB LED Light Sources Using Junction Temperature Measurement, IEEE Industrial Electronics Society, 33rd analal conference, 2007.

* cited by examiner

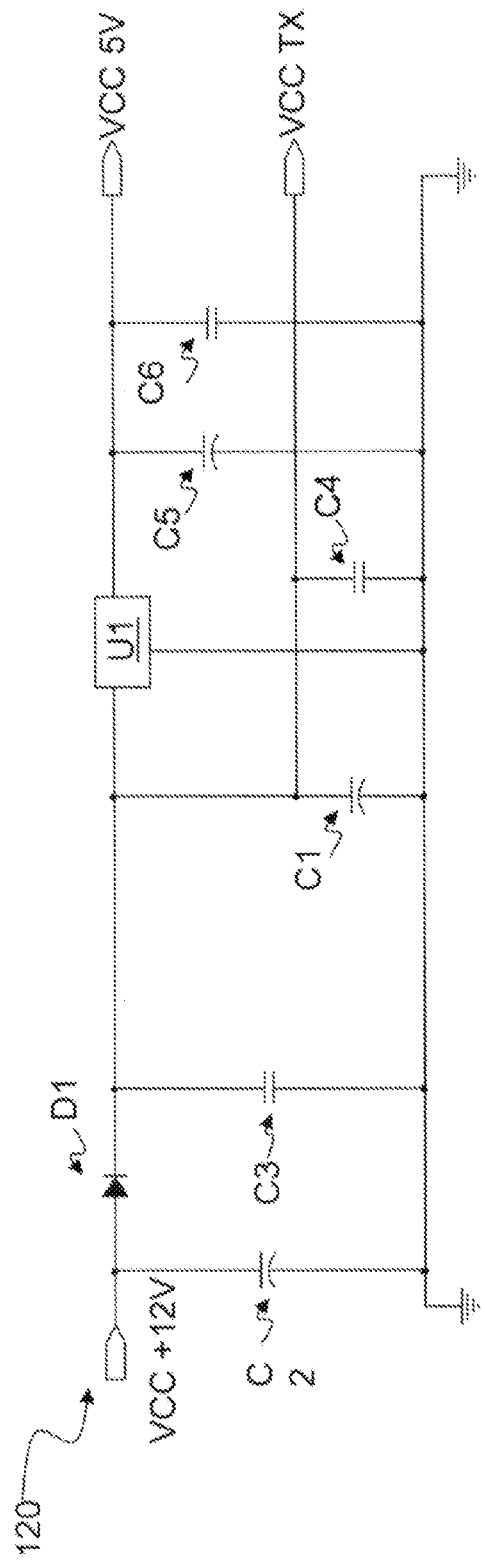
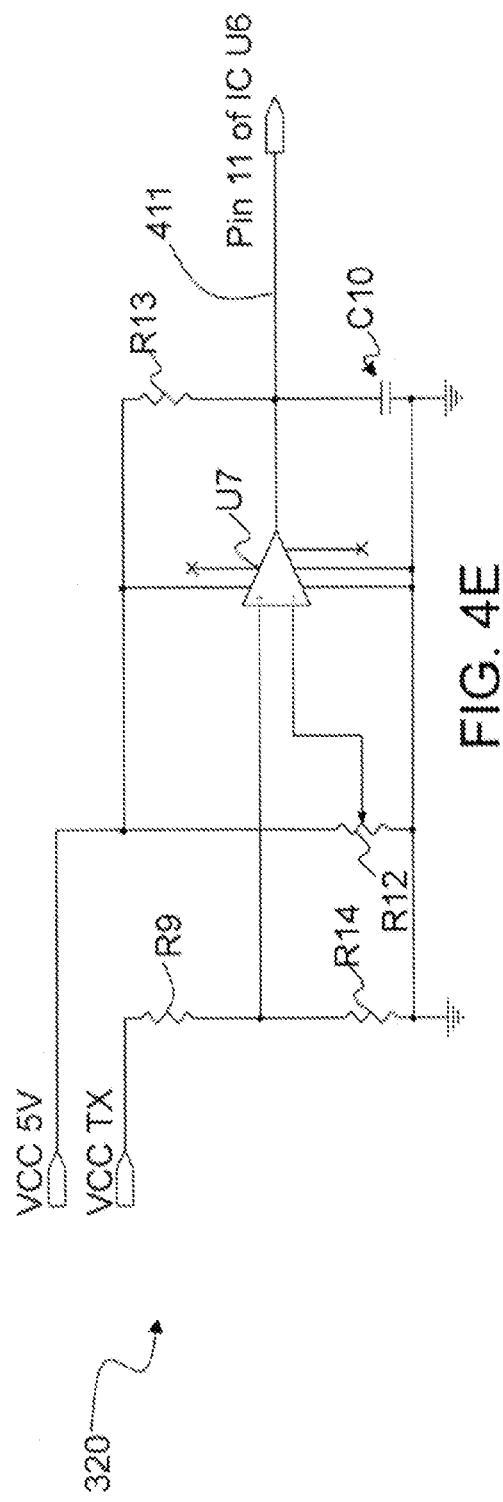
FIG. 4D
FIG. 4E

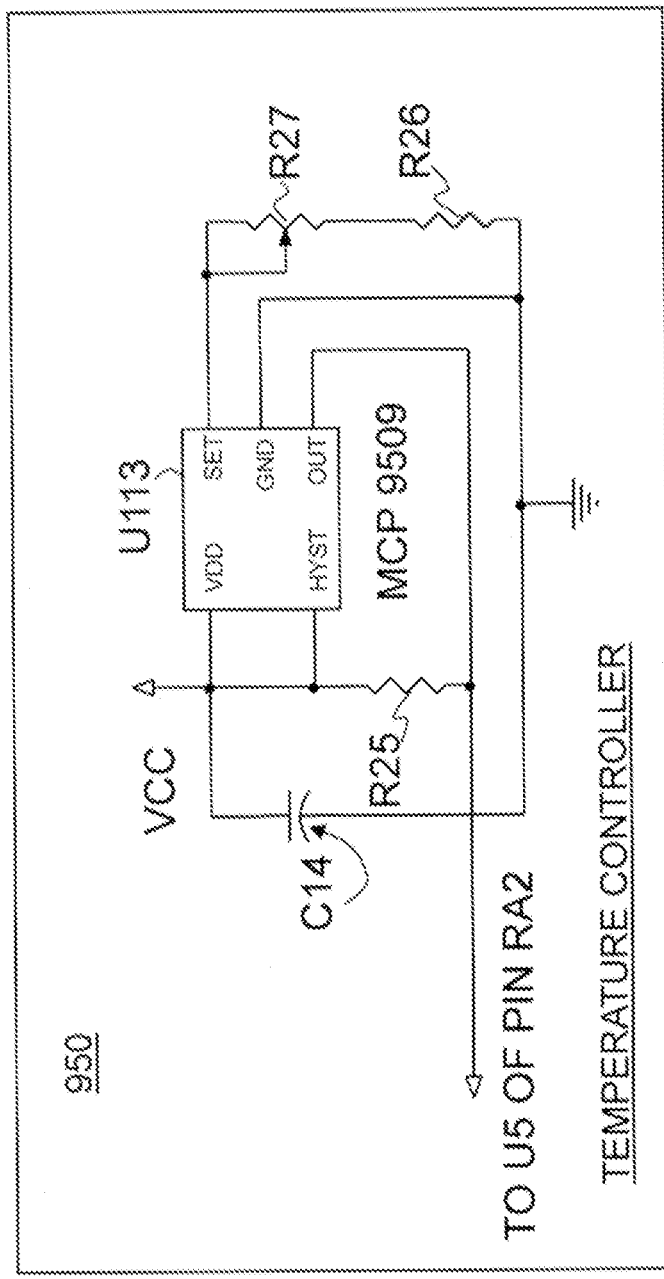

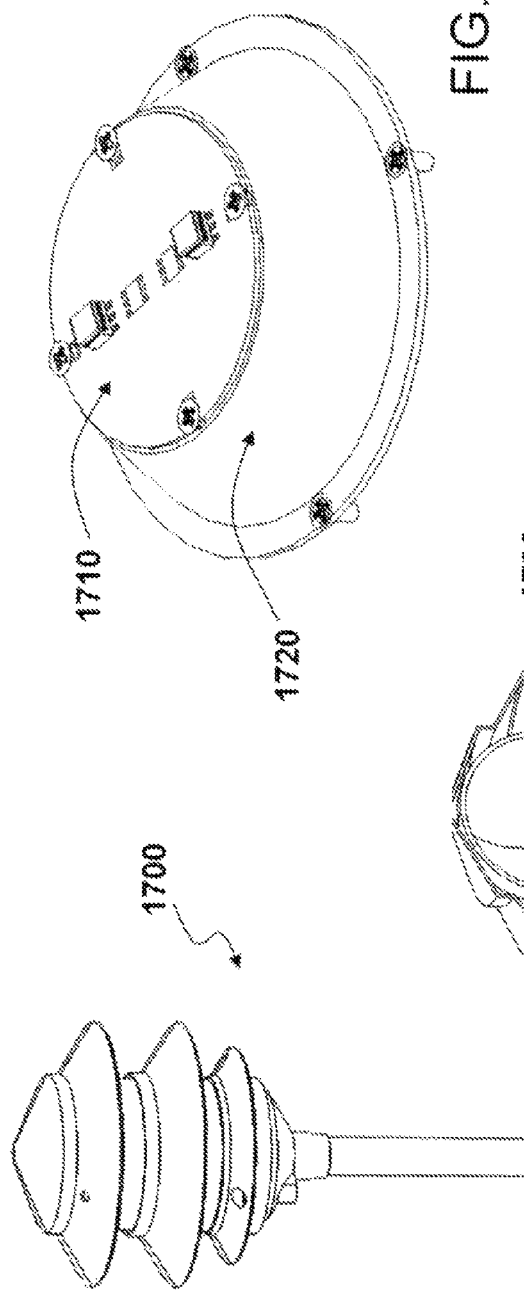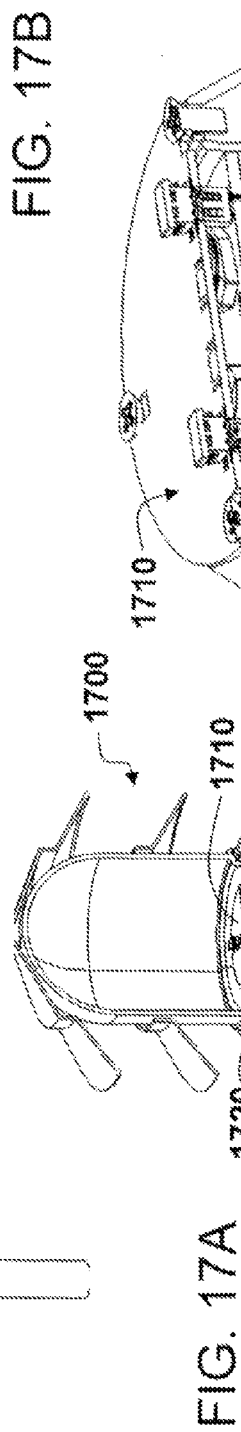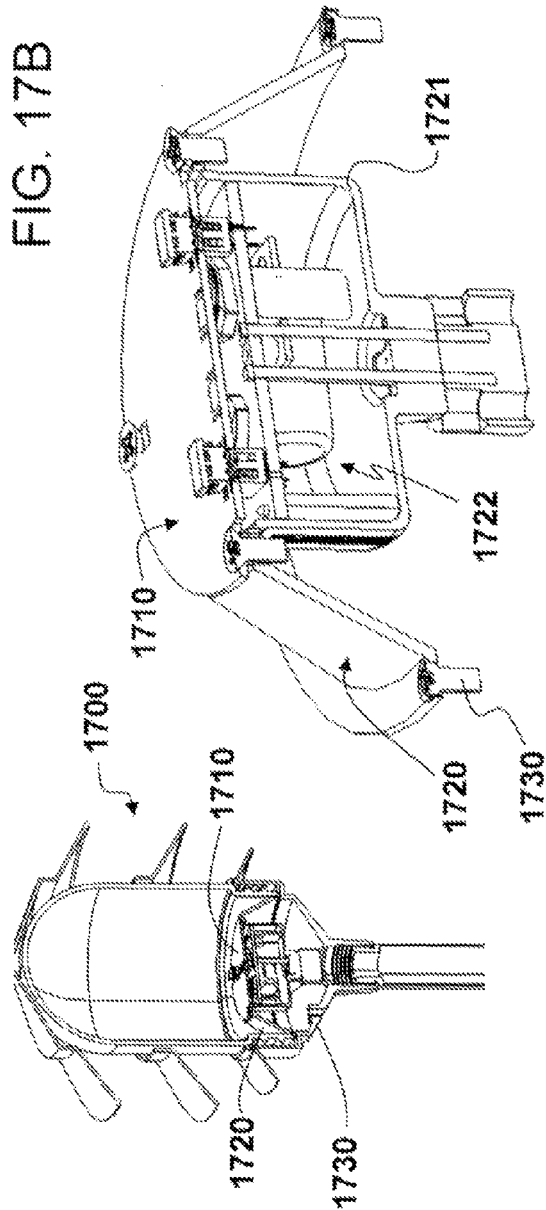

CONTROL SYSTEM FOR COLOR LIGHTS

CROSS-REFERENCE TO RELATED APPLICATIONS

This application is a continuation of International Application No. PCT/US2009/069938, filed Dec. 31, 2009, which is hereby incorporated by reference in its entirety for all purposes.

TECHNICAL FIELD

The invention, in its several embodiments, generally relates to lighting systems based on light-emitting devices and more specifically to a method and apparatus of controlling one or more Light-Emitting Diodes (LED) clusters or triplets in order to provide a display of different colors as perceived by a person, and still more precisely, to effect various colors and display patterns from an array of LEDs based on high-low DC logical methods of signaling.

BACKGROUND ART

Decorative lighting via a controlled lighting system is disclosed in U.S. Pat. No. 4,317,071 to Murad in which three circuits are disclosed as directly connected to one or more lighting element of a particular color. U.S. Pat. No. 7,358,626 to Gardner discloses a direct current (DC) power communication system having bi-directional communication for use in an irrigation system, particularly in a master-slave architecture comprising a plurality of slaves. Gardner discloses the system having H-bridge drivers allocated individually to communicate with each slave unit.

SUMMARY

The present invention includes system and method embodiments for color changing lighting comprising a programmable controller along with driver circuit, a single or combination of light-emitting devices such as LEDs, and an OFF/ON switch which is used for making a selection of the mode of operation, as well as, switching the system ON/OFF. Brightness may be adjusted or varied via pulse width modulation. The LEDs may be selectively activated by a programmed variable pulse to generate the desired color mixing effect. The resulting illumination may be controlled by a computer/microcontroller executing machine-readable instructions to effect designated patterns of light.

The present invention also includes system and method embodiments pertaining to light-emitting device assemblies such as LED-based lighting assemblies capable of generating common spectrum color and other lighting effects such as a marquee effect, e.g., running color chasing lights. The exemplary assemblies may comprise a pre-programmable microcontroller device as master and one or more slave units comprising LED lighting circuits and LEDs. The LEDs may be driven by the LED driver circuits under the control of slave microcontrollers to alter the brightness as per a command sequence from the master control. Embodiments of the present invention have the master unit communicating to the slave units through the DC power line. The LEDs may be selectively activated by programmed variable current to generate the desired color mixing effects. The resulting illumination may be controlled by a computer or microcontroller program of computer-executable instructions to provide patterns of light.

Exemplary system embodiments of the present invention may include a system comprising: (a) a master control comprising a microcontroller and a power line polarity switching unit controlling a level of direct current from a direct current source to one or more slave control units via a first power line of a direct current (DC) circuit having a voltage polarity and a second power line of the DC circuit having a voltage polarity opposite the polarity of the first power line, the master control configured to communicate with the one or more slave control units via a time series of the voltage polarities of the first power line and the second power line; and (b) one or more slave control units wherein at least one of the slave control units comprises a polarity detecting module and a slave microcontroller configured to set a mode of operation based on a series of detected polarities of the direct current of the first power line. In some embodiments, the line polarity switching unit of the master control comprises an H-bridge circuit. In some embodiments, the polarity detecting module of the at least one slave control unit comprises a switching circuit, for example, a switching transistor in communication with the slave microcontroller and the first power line. In some embodiments, the at least one of the slave control units further comprises light-emitting device circuitry, such as one or more LED drivers and one or more LEDs.

Exemplary method embodiments of the present invention include a method of communicating between a source, e.g., master, electronic device and a destination, e.g., slave, electronic device via a direct current circuit comprising: (a) switching direct current (DC) line polarity of a DC circuit comprising a first line and a second line, based on high voltage signals and low voltage signals at the source electronic device; (b) providing the first line to a polarity detector; and (c) receiving, at the destination electronic device, high voltage signals and low voltage signals based on the detected polarity. Some method embodiments may comprise the additional step of effecting one or more mode state changes at the destination electronic device based on a series of received high signals and low signals. Some embodiments may effect the polarity switching via an H-bridge. Some embodiments may effect the polarity detection via a switching transistor in communication with the first line.

Another exemplary embodiment of the invention may comprise a structure comprising a fixture housing comprising a thermally conductive material wherein the fixture housing is configured to detachably attach to a body of a lighting fixture housing which may further comprise a light emitting diode assembly circuit board in thermal communication with the fixture housing. This exemplary embodiment may further be configured to receive a light bulb and engage the bulb in thermal communication with the fixture housing.

BRIEF DESCRIPTION OF THE DRAWINGS

FIGS. 4A-4G are electrical circuit schematics of the exemplary master control unit with an exemplary communication interface;

FIG. 12 is an exemplary schematic of a temperature controller of a slave unit;

FIGS. 17A-17D depict an exemplary light fixture configured to receive an LED module.

BEST MODES FOR CARRYING OUT THE INVENTION

Figure 1A:
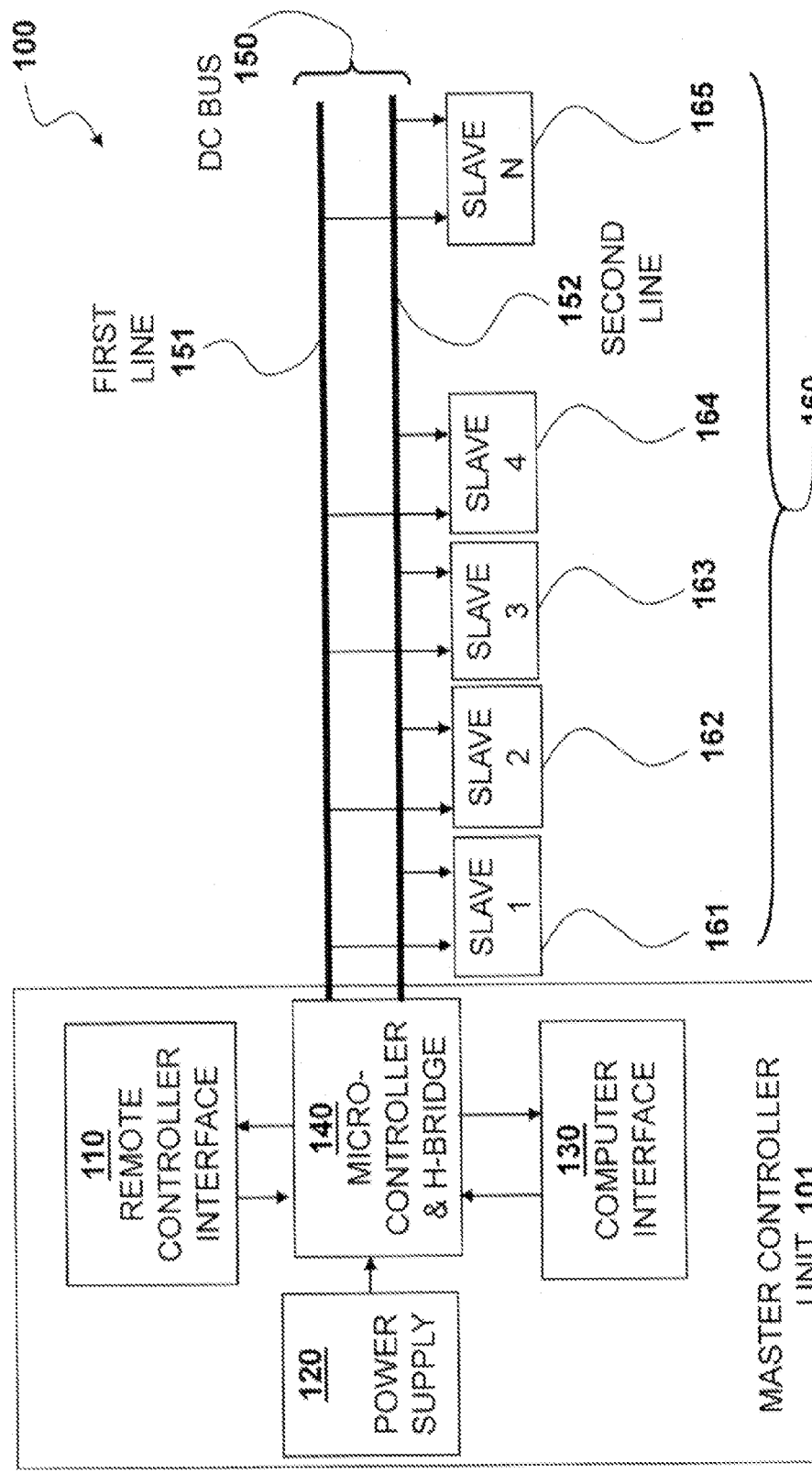
FIG. 1A is a functional block diagram of an embodiment of the present invention.

Exemplary system embodiments of the invention may comprise: (a) a master module and may further include; (b) one or more slave modules having one or more light-emitting devices such as LED fixtures; and (c) a communication link between the master module and slave module. The color and/or intensity information to the LED fixtures of the slaves is provided by the master control of the master module. This color information may be transmitted to the one or more slaves to which the information is intended via the DC bus employing a time series of polarity switches between the two lines of the bus. Each slave microcontroller may execute machine-readable instructions to receive and decode commands and data from the master and to activate the pulse width modulation (PWM) generators, analog dimming or other commands for intensity changing at the LEDs. The slaves, upon receiving and decoding the time series of polarity switches between the two lines of the bus, each slave, responsive to the color information, may generate PWM waveforms with duty cycles to drive the corresponding LED driver chip. The slave microcontroller may also execute instructions to change the address of the slave unit according to an indicated user preference. A user may remove, i.e., disassociate, a slave from the network by invoking computer-executable instructions, and accordingly a user may not necessarily be required to physically disconnect a disassociated slave unit. In some exemplary embodiments, the slaves may be capable of driving up to ten watts of power while the total allocated power may be 100 watts for all slaves.

The master-slave embodiments may be implemented as unidirectional communication systems, i.e., from master to slave, and accordingly, such one-way communication may support rapid and responsive variations in lighting effects that may be produced by the slaves. The master-slave embodiments may be implemented via a single H-bridge driver in order for the master unit to communicate to slave units. Other master slave embodiments may have more than one H-bridge driver, particularly for exemplary systems that have so many slaves that the total load may exceed the capacity of a single H-bridge driver. The master-slave embodiments may be implemented via a single pair of wires, and so the master-slave embodiments may readily integrate with existing, e.g., legacy, infrastructures for purposes of retrofitting existing LED systems. The communication signals from master to slave may be accomplished via pulse-shaping and, having no high frequency carrier. Accordingly, the master-slave arrangement may operate robustly in the face of what may otherwise be radio frequency interference (RFI). Embodiments of the master-slave system may exhibit short circuit protection that may be built into the H-bridge, in that, if a short circuit is detected, the H-bridge will open and the slaves will be disconnected from the DC bus/power line.

Embodiments of the present invention may produce simple or complex lighting patterns, e.g., a marquee effect. Embodiments of the present master-slave system, communicating between the master and a plurality of slaves via the DC power line, may produce various lighting patterns including: (a) a running light effect, leftward or rightward, the speed and color being selectable; (b) a white light, having a tunable hue; (c) a synchronized color-changing mode, speed selectable; (d) a static/fixed color mode, color selectable; and (e) a color-changing running light, i.e., a traveling rainbow effect.

Figure 1B:
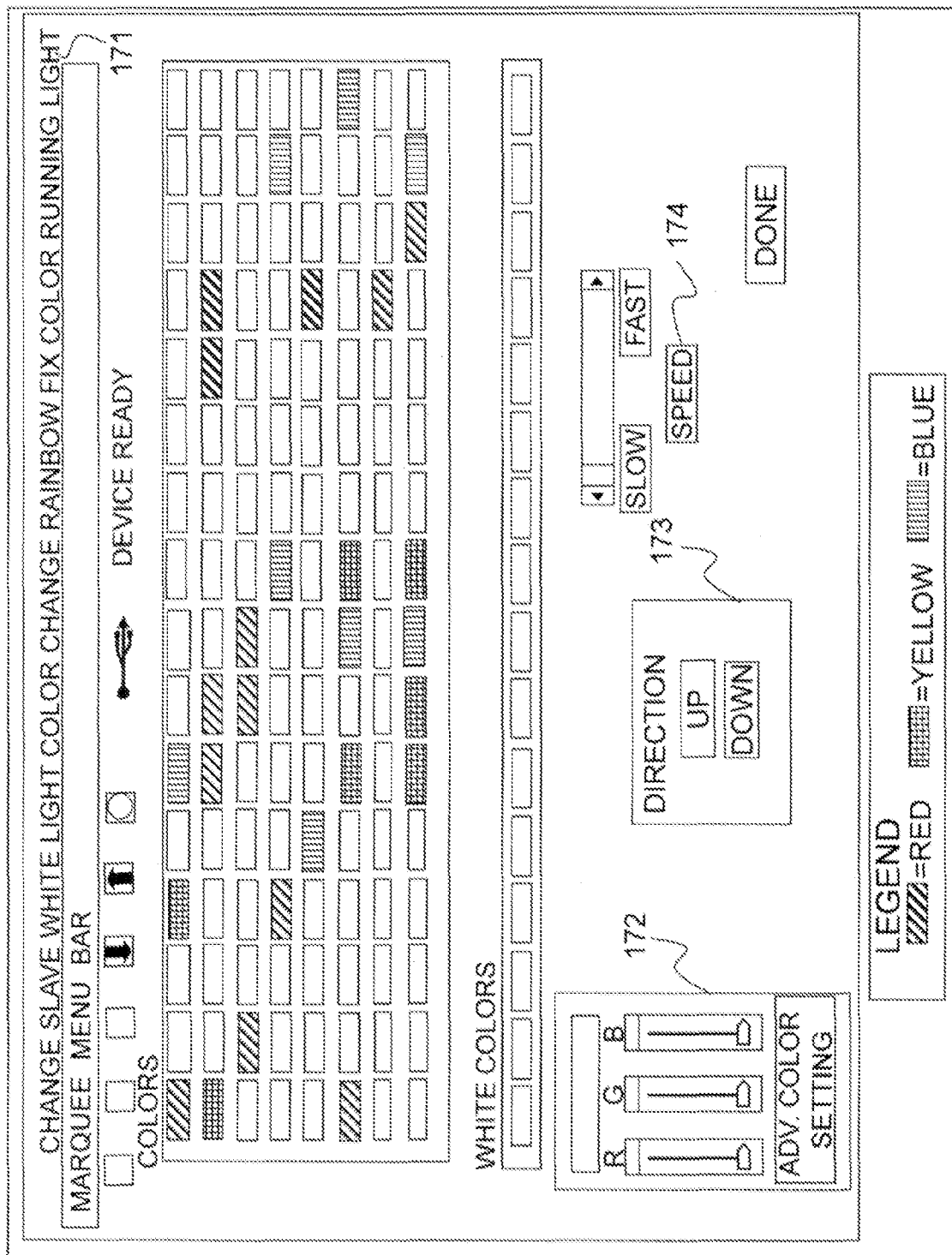
FIGS. 1B and 1C each depict an exemplary graphical user interface of an embodiment of the present invention.
Figure 1C:
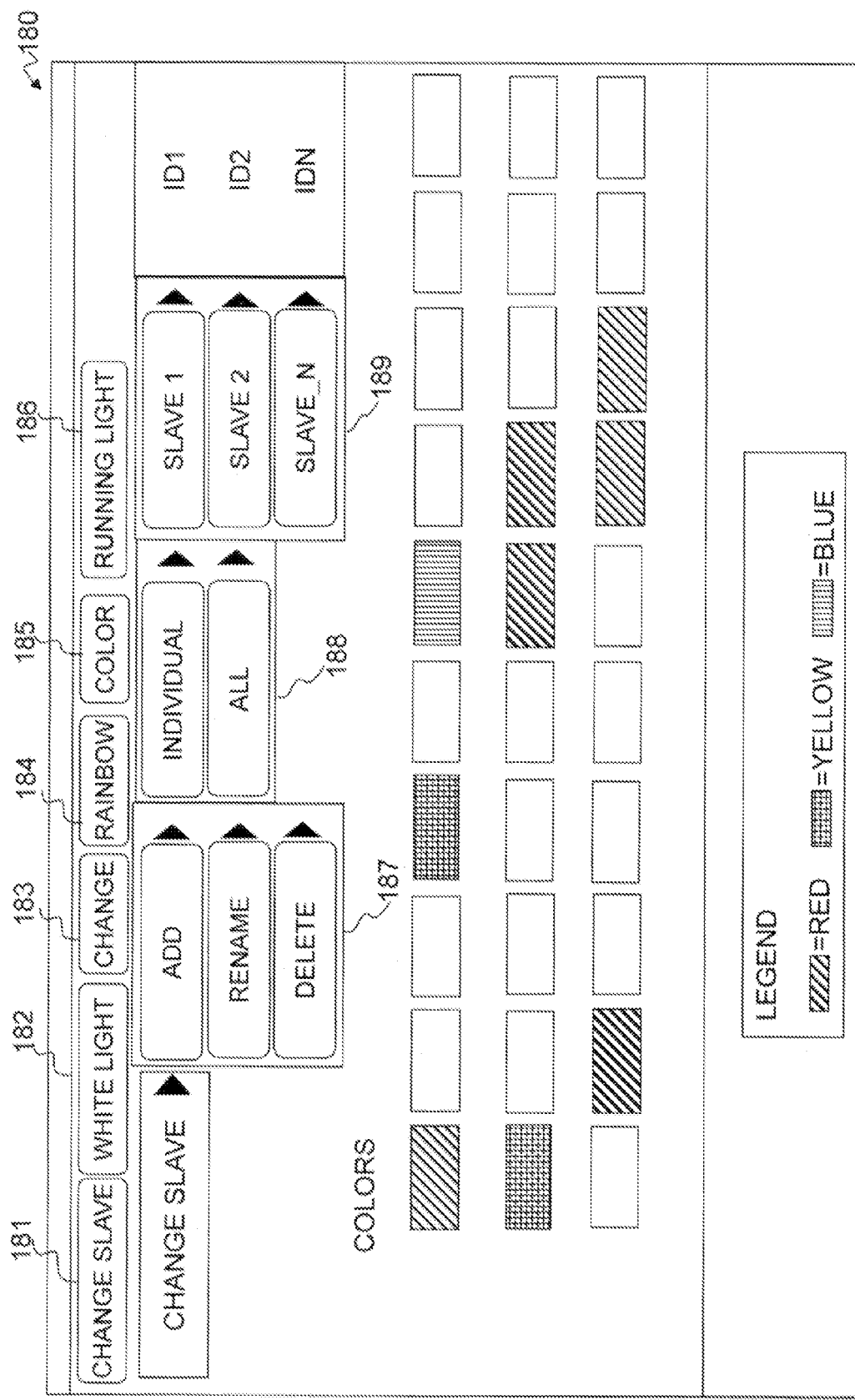

FIG. 1A shows a functional top level block diagram of a master-slave system embodiment 100 of the present invention. The exemplary system 100 may include a master control unit 101 that may comprise a remote controller interface 110, a power supply 120, a computer interface 130, and may particularly include microcontroller and H-Bridge circuitry 140. The exemplary system 100 may further include a DC bus 150 comprising two lines 151, 152, and an array 160 of one or more slave units 161-165. Each slave unit 161-165 may further comprise a light emitter such as a tricolor LED and an LED driver circuit. The functional block diagram illustrates a single master controller 101 in communication with and controlling, via DC power over a DC bus 150, a plurality of slaves 161-165. The polarity of the first line 151, or Line A, and the second line 152, or Line B, may be modulated by the master 101 to provide binary encoded information and/or one or more individual slave designations enabling the system as a whole to produce a desired lighting effect. The slaves 161-165, upon recognizing a received command via detected polarity switching on the DC bus 150, change the brightness of the light emitting elements, such as LEDs driven by an LED driver chip. The light emitter at the slave may be single or combinations of red, green, and blue LEDs, for example, 1 watt or 5 watt ratings, and hereafter referred to as R, G and B LEDs, or RGB LEDs, such as those that may be procured as LUXEON™ LEDs produced by Philips, specifically the Philips Lumileds Lighting Company, may be used as light sources, for example. The LEDs may be driven by switch-mode, constant current, or LED drivers. The LED driver may receive a PWM, or dimming, signal from the slave microcontroller 930 (FIG. 9) such as PIC 16F688 available from Microchip Corp, for example. The computer interface 130 of FIG. 1A may include a graphic user interface (GUI), and FIG. 1B depicts an exemplary GUI screen display 170 that may be embodied on a touch screen where a user may select a display effect, i.e., a rainbow fix color running light 172, for each RGB node in communication with the master via touching the one or more various settings 172-174. FIG. 1C depicts another exemplary GUI screen display 180 that may be embodied on a touch screen where a user may select a display effect and/or add or delete a slave unit from the active system via touching one or more various settings 181-189.

Figure 2:
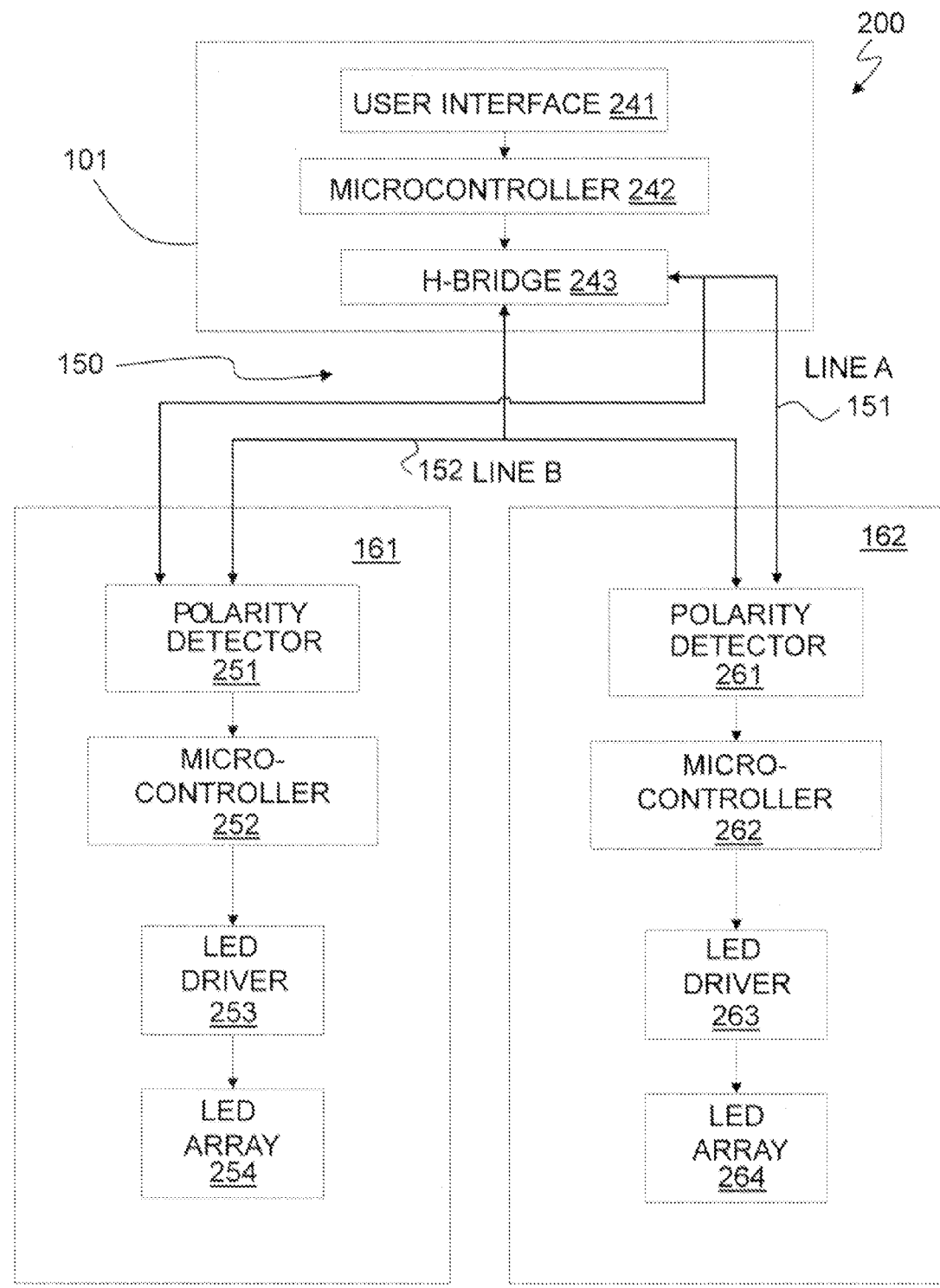
FIG. 2 is a functional block diagram of an embodiment of the present invention.

FIG. 2 is a functional top level block diagram of an exemplary system embodiment 200 of the present invention comprising a master control unit 101, a first slave 161 and a second slave 162 in communication with the master control unit 101 via a first line 151, or Line A, and a second line 152, or Line B, of a DC bus 150. The master control unit 101 is shown comprising a user interface 241, a microcontroller 242, and a polarity switching unit that, in this example, is an H-bridge 243. The first slave 161 is shown comprising a polarity detector 251, a microcontroller 252, an LED driver 253, and an LED array 254. The second slave 162 is shown comprising a polarity detector 261, a microcontroller 262, an LED driver 263, and an LED array 264. The master unit 101 is in communication with the slave units via DC power lines, 151, 152. The slave units 161, 162 including their respective LED arrays 254, 264 are powered via the DC power lines 151, 152. The master microcontroller 242 may place slave units 161, 162 in a particular display mode by switching the polarity of the DC power lines 151, 152 according to a polarity versus time pattern associated both at the master unit 101 and at the slave unit 161, 162, with a particular display mode. The master unit 101 includes a polarity switching unit that, in this example, is an H-bridge 243 that switches the voltage values between the DC power lines 151, 152 according to a defined timeline associable with either a particular slave and/or a particular light emission pattern for that slave or a plurality of slaves. Each of the two slave units 161, 162, in this example, have a polarity detector 251, 261, along with a microcontroller 252, 262, configured to decode the train of switching polarities and determine an LED display mode setting for the particular slave unit.

Figure 3:
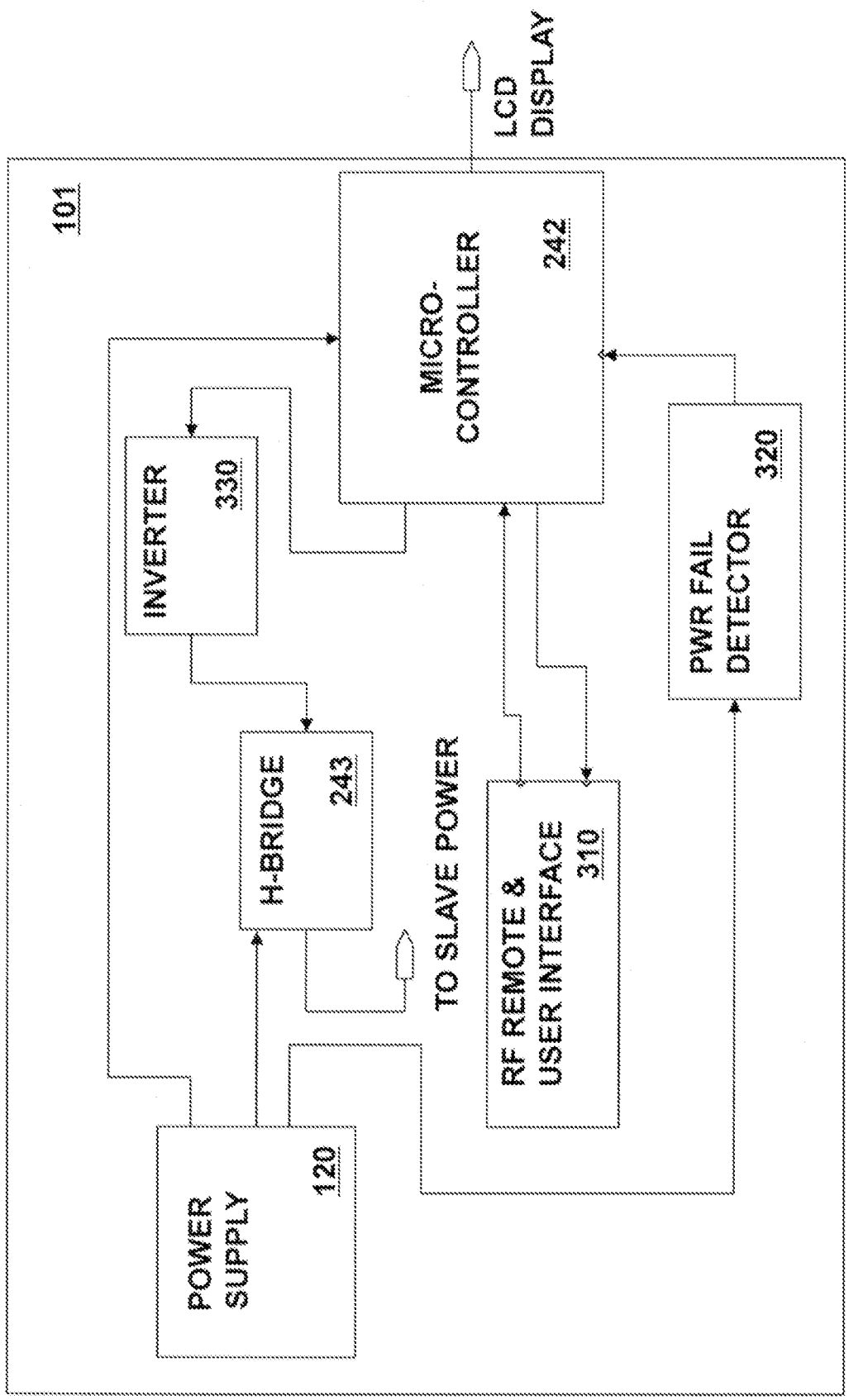
FIG. 3 is a functional block diagram of an exemplary master control unit.

FIG. 3 is a top level block diagram of an exemplary embodiment of the present invention depicting a master control unit 101 comprising an RF remote and user interface 310, a microcontroller 242 and line polarity switching unit, in this example, that is an H-bridge 243. The master control unit 101 may interface with a keyboard and LCD display as a user interface 310 for changing the settings and mode of operation. A radio frequency (RF) remote control may be separate or may also be incorporated into the user interface 310 circuitry of the master control unit 101 to enable a user to set lighting preferences remotely.

Figure 4A:
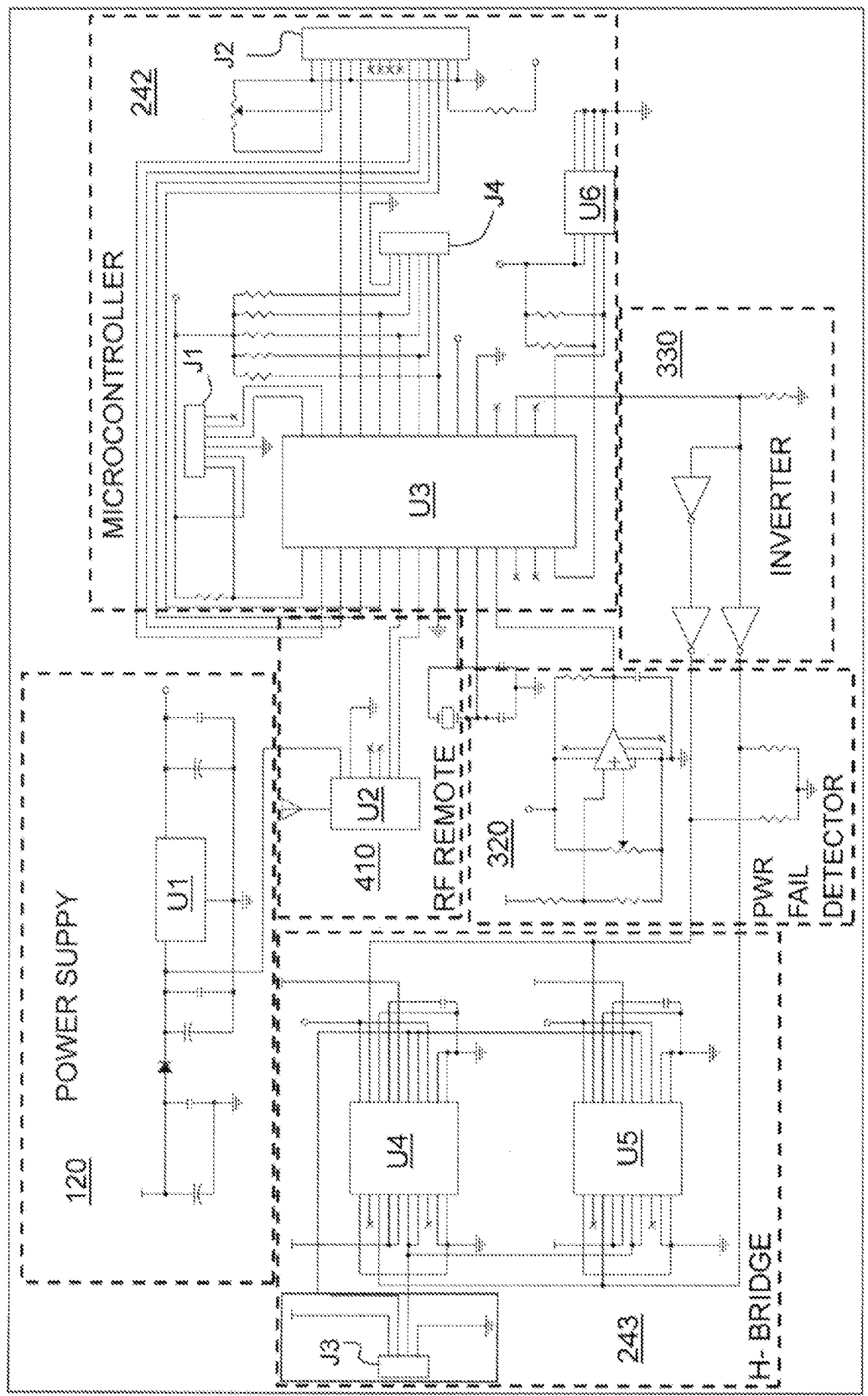
Figure 4B:
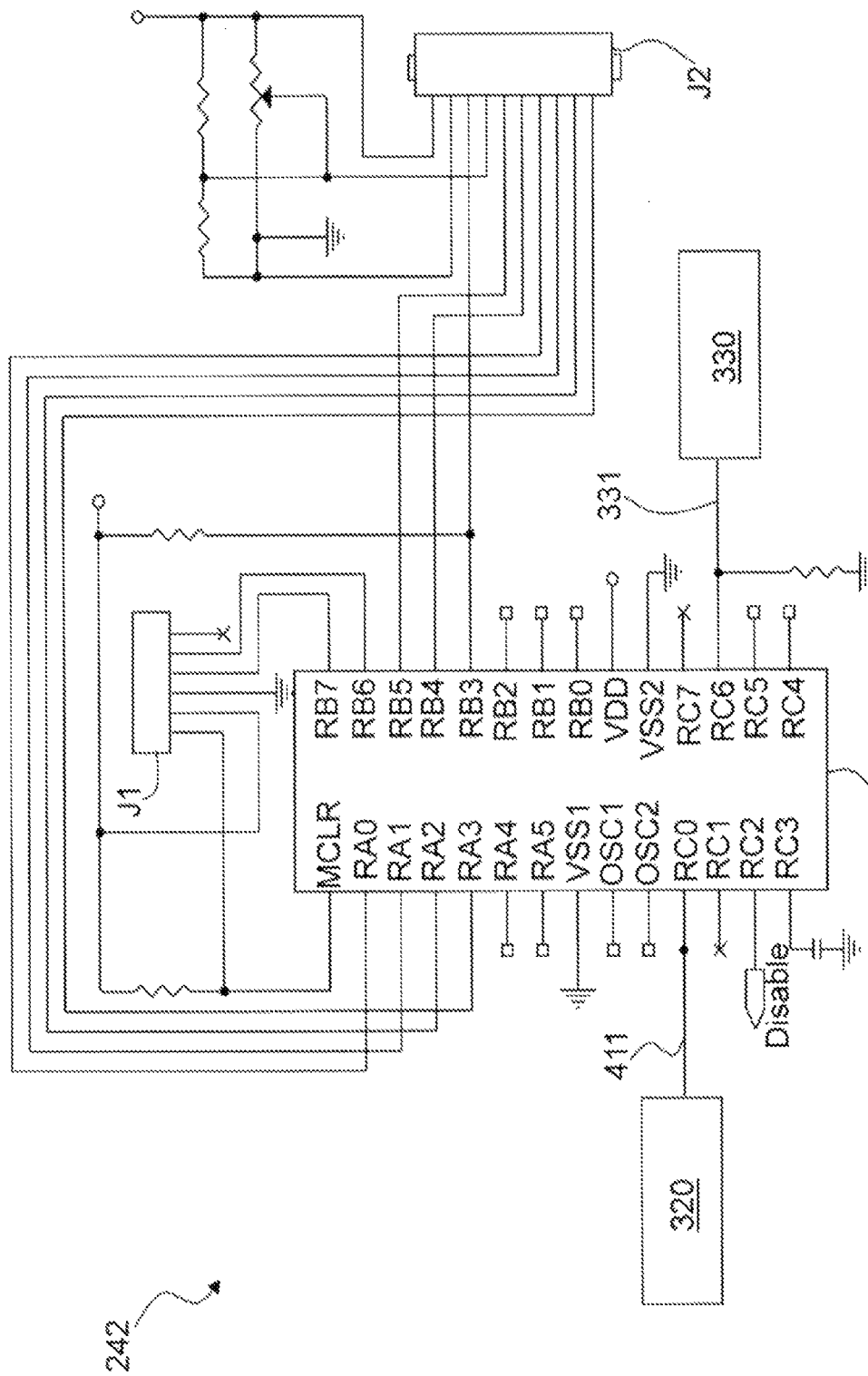
Figure 4C:
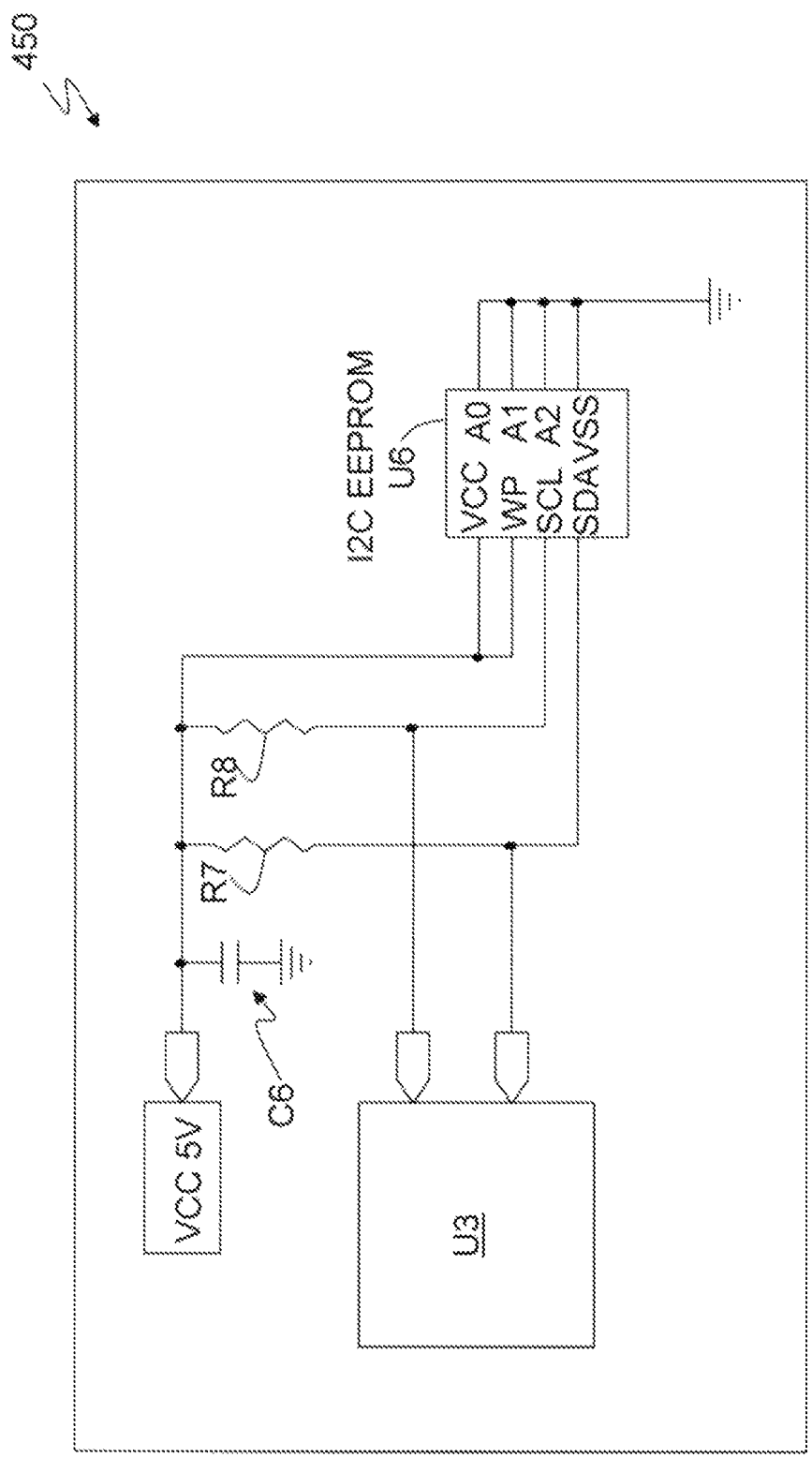

FIGS. 4A-4G illustrate exemplary electrical circuit diagrams of a master control unit embodiment of the present invention. FIG. 4A depicts a top level schematic comprising circuitry for the power supply 120, the H-bridge 243 is depicted via a pair of UARTS, the optional RF remote 410, the power fail detector 320, the inverter 330 and the microcontroller 242. Four connectors are shown: J1, J2, J3, and J4. Six chips are shown, U1-U6. The connector J3 is depicted, in this example, as a four-point connector for the power supply 120 input and for getting DC power output to slaves. 12V DC may be provided by an external power supply that may be, for example, a transformer power supply or a switched mode power supply (SMPS). FIG. 4B illustrates exemplary circuitry of the microcontroller 242 of FIG. 2. The integrated circuit U3 is shown connected to the power fail detector 320 via a pin and connector 411 and the integrated circuit is shown connected to the inverter circuitry 330 via a pin connector 331. FIG. 4C depicts an exemplary Electrically Erasable Programmable Read-Only Memory (EEPROM) memory circuit 450 including the integrated circuit U6, resisters R7 and R8, and capacitor C6. The exemplary EEPROM memory circuit may be configured with the microcontroller module 242.

FIG. 4D shows an exemplary schematic circuitry for a power supply 120 providing 5 V DC to modules of the master microcontroller 242, depicting an integrated circuit, U1, a diode D1, and capacitors C1-C6. Diode D1 prevents discharge of capacitor C3 to 12V power during fail. The exemplary three terminal linear voltage regulator integrated circuit (IC), U1, is shown outputting a regulated 5 volt DC that may then be provided to other components of the master control unit such as the microcontroller 242, addressable memory such as EEPROM, an LCD display, CD4049 driver IC such as a CD4049, and power detection comparator IC such as LM311. FIG. 4E shows an exemplary power fail detection circuit 320 comprising resisters R14, R9, R12, and R13 and capacitor C10, and further comprising the power detection comparator IC, U7 having an output to pin 11 (ref no. 411) of the integrated circuit U6 of the microcontroller 242 of the master control unit 101 (FIG. 4A). The exemplary schematic circuitry for power fail detection circuit 320 may be embodied with the IC being an LM311-type. FIG. 4E shows the reference voltage derived by potentiometer R12 from a five volt regulated line as compared with a fraction of the 12V DC supply voltage DC voltage from the 12V DC line—using the potential divider comprising resisters R14 and R9. If this voltage goes below the reference, the comparator output goes to a low state to signal to the microcontroller 242 (FIG. 4A) to save the current setting. The resister R12 may be adjusted in such a way that power failure is detected if the DC output power, for example, the 12V DC power supply goes below 10 Volts. This early detection of the power failure enables the microprocessor integrated circuit U3 to store various system variables into the EEPROM and thus increase the endurance of memory, such as EEPROM.

Figure 4F:
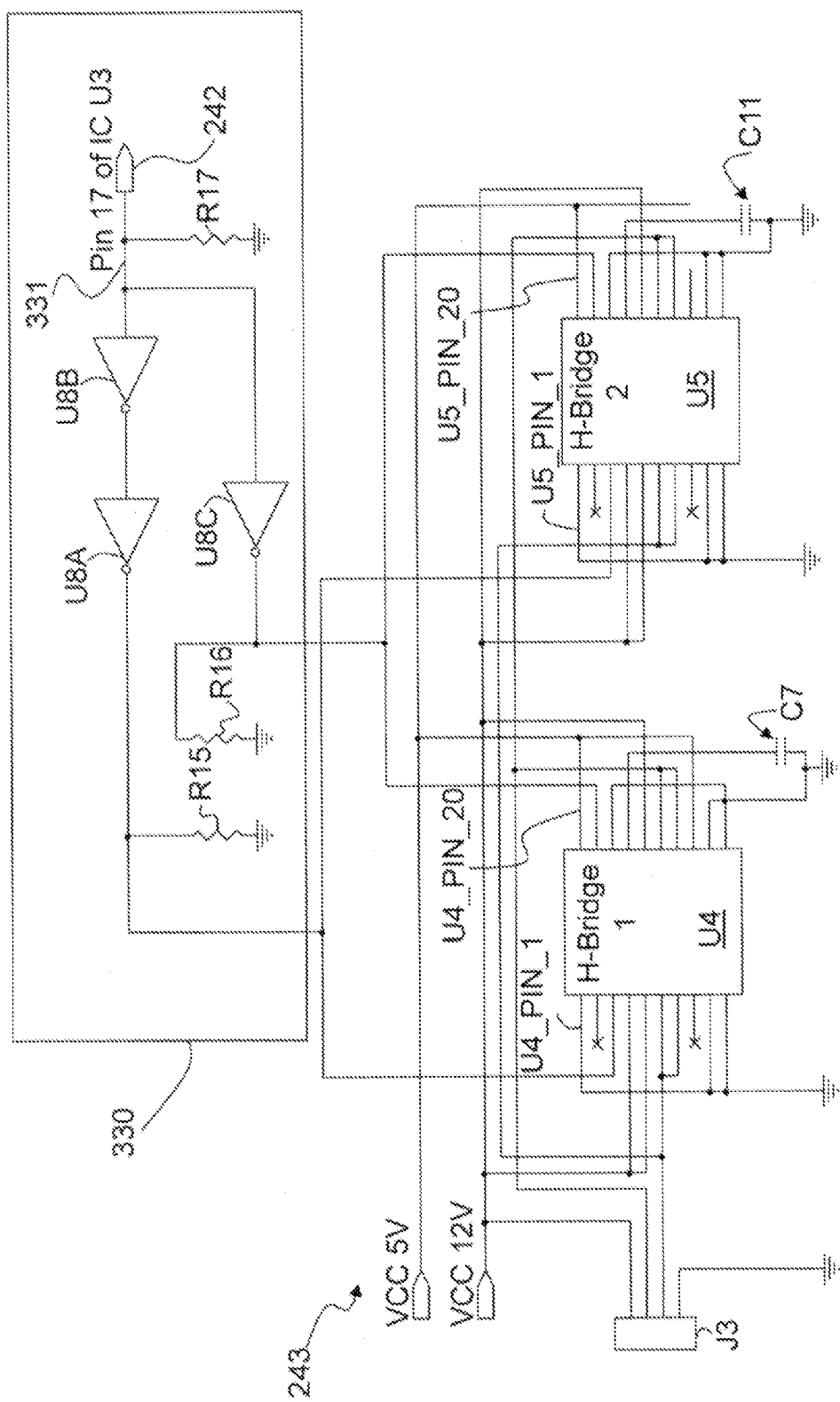
Figure 4G:
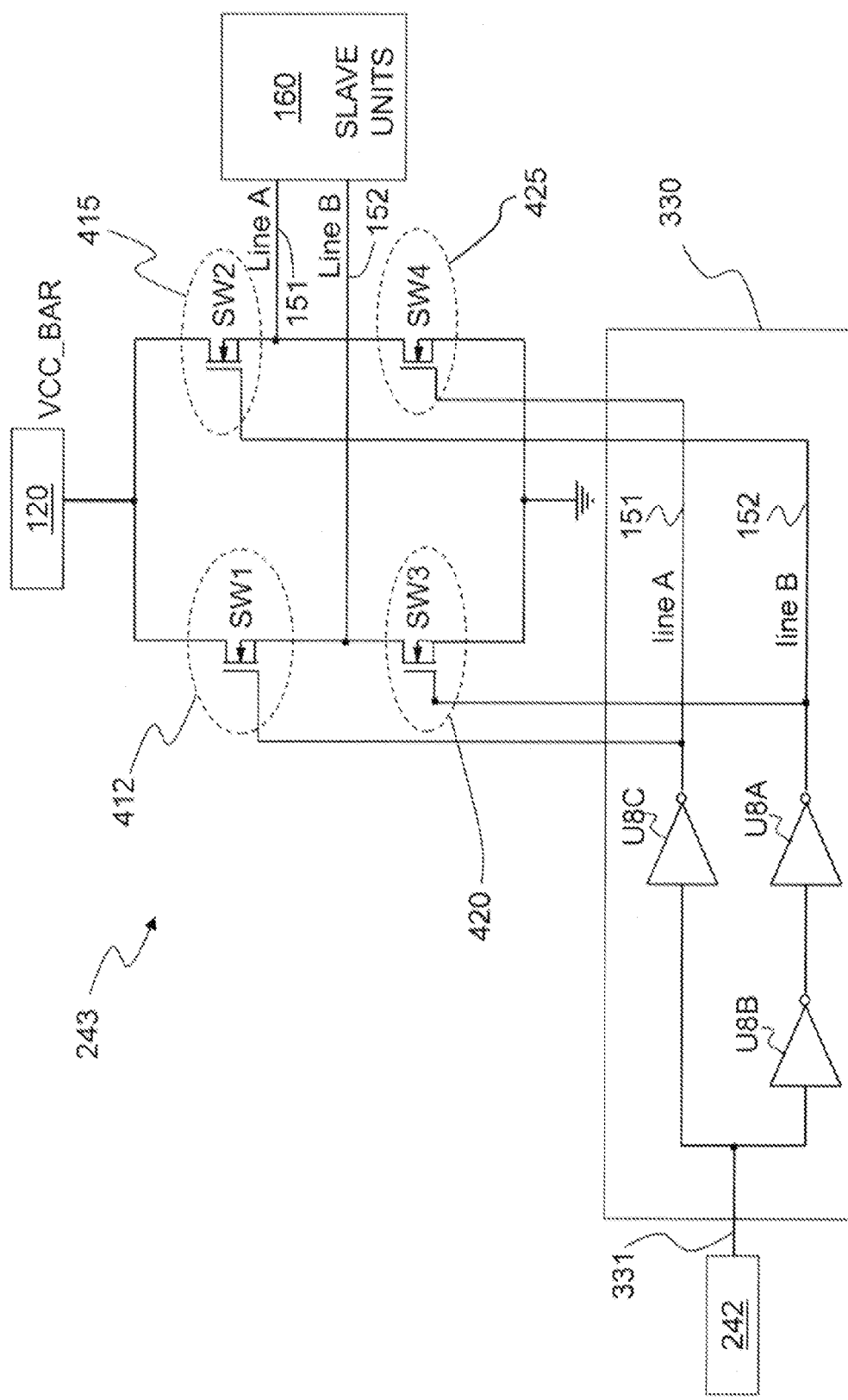

FIGS. 4F-4G illustrate schematic circuitry for an exemplary H-bridge circuit and inverter. FIG. 4F shows the circuitry of an exemplary inverter 330 and H-bridge circuitry 243 based on two chips, U4 and U5. For example, via pin 17 (ref. no. 331) of the integrated circuit, U3 of the microcontroller 242 (FIG. 4A), a signal may be processed via the inverter circuitry 330 comprising resisters R15, R16, and R17, and further comprising inverters U8A, U8B, and U8C. The exemplary H-bridge circuitry 243 comprises a connector J3, a first H-bridge component, U4, having twenty pin connections, e.g., U4_PIN_1 and U4_PIN_20, a second H-bridge component, U5, having twenty pin connections, e.g., U5_PIN_1 and U5_PIN_20, and capacitors C11 and C7. The exemplary circuitry of FIG. 4F facilitates a 12V DC supply to the slaves and, by polarity switching time sequences, may signal mode changes to the one or more slaves. Accordingly, the communication between the master and one or more slaves may be achieved by using the H-bridge 243. The H-bridge 243 supplies power to the slaves through a connector J3 and may be a line driver for the signal for the universal asynchronous receiver/transmitter (UART) microchip, U3, of the microcontroller 242. Other H-bridge topologies are envisioned where the common arrangement includes four binary position switches. In the example of FIG. 4F, an H-bridge circuit may be built around a part such as MC33887 that, in this example, may be driven by a CD4049 CMOS IC using a complimentary output data signal as an input from a microcontroller 242 port pin. The H-bridge 243 may be driven in such a way that under the idling condition, the output of the H-bridge 243 is 12V DC with a polarity of +12V with respect to line A 151 (FIG. 2). Drive to the H-bridge 243 itself may be driven by the logic gates, e.g., U8A, U8B, and U8C, of an inverter 330, that may be a CD 40449 inverter, so as to change the polarity of the DC BUS when a logical "Low" is present at the master control transmit data port pin of U3 of the master microcontroller 242. Multiple numbers of the H-bridge circuitry 243 may be added to the master control unit 101 (FIG. 2) and a star topology for DC bus connection may be applied to drive more power.

FIG. 4G is a top-level schematic of the H-bridge 243 and driver circuit. The H-bridge 243 in the top-level schematic is shown comprising four metal-oxide semiconductor field effect transistors (MOSFETs) acting as switches, namely SW1 412, SW2 415, SW3 420 and SW4 425. These switches are made ON and OFF in pairs, e.g., (a) SW1 412 and SW4 425 as a pair; and (b) SW2 415 and SW3 420 as a pair. Serial data from the UART output of the master microcontroller 242 may be used to control the H-bridge 243 through three inverter gates U8A, U8B, U8C. If serial data is "0," i.e., a logical Low, then "Ln A" will be at a logical "High" state and "Ln B" at logical "Low" state. Now SW2 415 and SW3 420 will be switched off while SW1 412 and SW4 425 switch on. So, a level of +12 V results at Line A 151 and −12V results at Line B 152. This condition is reversed when the serial data to be sent is "1," i.e., a logical "High." For logic "1" at the UART pin 331, the pair of switches SW1 410 and SW4 425 are switched off and the pair of switches, SW2 415 and SW3 420, are switched on. This causes +12 V to appear at Line B 152 and −12V at line A 151.

All MOSFETs have an "on resistance." This may be considered a resister in series with the load. In a particular MOSFET data sheet, this value is typically listed as Rdson (Resistance from drain to source while the device is on). N-channel MOSFETs typically have a lower Rdson resistance as compared to the P-channel types. Most power dissipated by a MOSFET may be due to the Rdson value. The Rdson value may also be dependent on the "gate drive voltage," i.e., voltage on the gate when referenced to the source. In addition to being dependent on the "gate drive voltage," the Rdson value will increase as the MOSFETs junction temperature increases. So, as a MOSFET heats, it may pass less current because of an increasing Rdson value. Therefore, if two or more MOSFETs are connected in parallel and are of the same type, and one begins to heat up, the hotter MOSFET may eventually begin drawing less current than the cooler MOSFET of the pair, and subsequently cool down.

Figure 5:
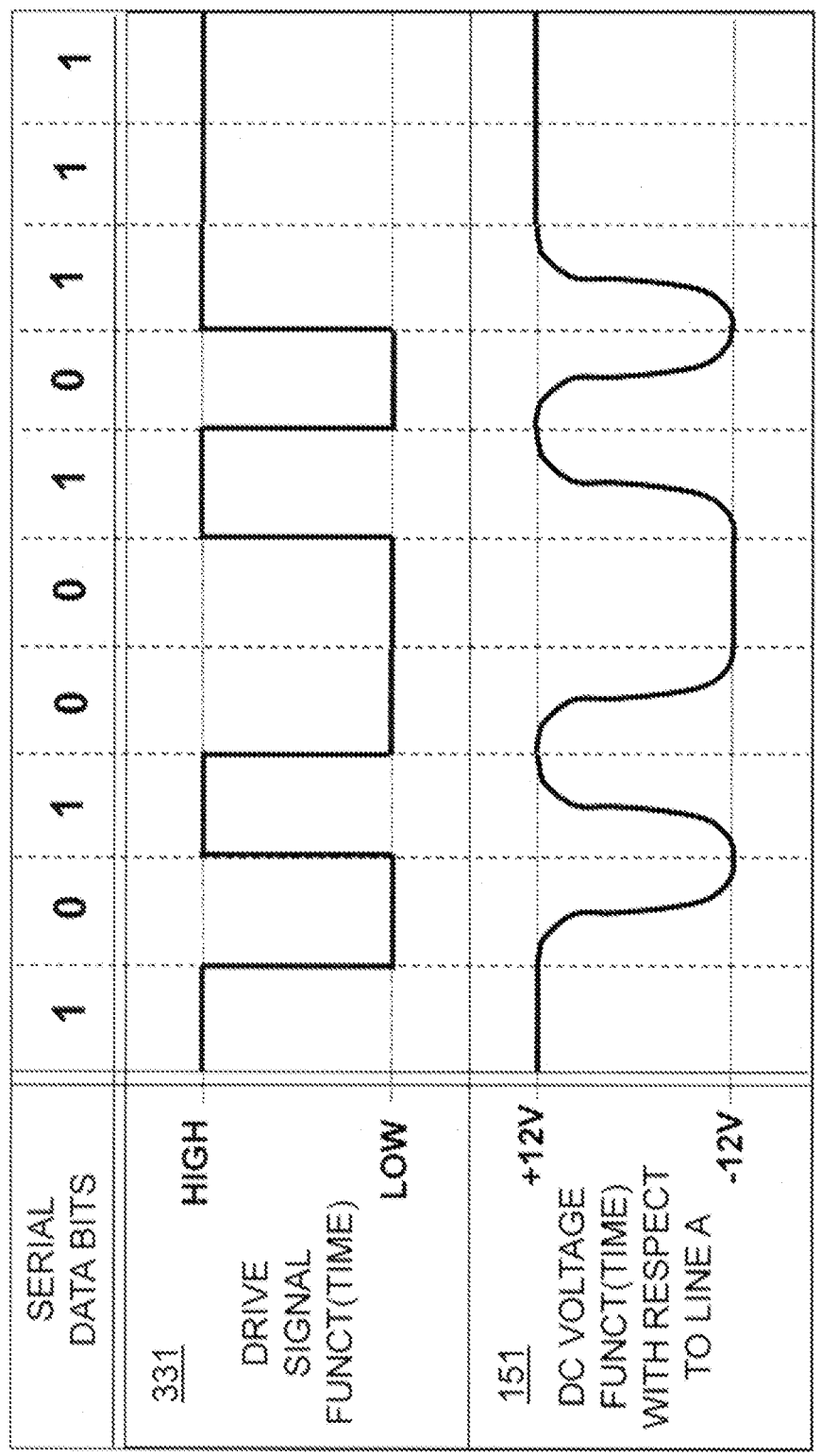
FIG. 5 illustrates exemplary data and corresponding line signaling of an embodiment of the present invention.

FIG. 5 illustrates a comparative time series of the drive signal having high and low states based on the value of the bit in a serial stream of bits and the exemplary DC voltage between +12 VDC and −12 VDC produced on Line A 151. As described above, Line B 152 is provided a polarity of signal opposite that of Line A 151 thereby closing, in this example, a DC circuit. Referring to FIG. 4A, the serial data available from a pin of the microcontroller 242, particularly UART U3, is conditioned via the inverter circuitry 330 and H-bridges 243 to provide on Line A 151 and on Line B 152 the DC voltages associated with the logical high and low values for each time increment corresponding to the time series of data bits.

Having described an exemplary method of communication from a master unit to a slave unit via a pair of DC lines exploiting polarity switching, the following are provided by way of example in Table 1, a command format by which a master may communicate to a slave. Exemplary commands may be sent by the master to a slave unit using a 7-byte command word, such as the example of Table 1, where the first byte is a start byte, the second byte indicates the one or more slaves to which the communication is intended, i.e., an address byte, the third byte may be a command byte, the fourth, fifth, and sixth bytes may be data bytes (P1, P2, and P3), and the last byte is an end-of-file (EOF) byte. The command byte may comprise one of various command codes.

TABLE 1

Exemplary Command Format

| 1 | 2 | 3 | 4 | 5 | 6 | 7 | <Byte |
|---|---|---|---|---|---|---|---|
| START | Address | Command | P1 | P2 | P3 | EOF | |

Table 2 provides an example of master unit commands that may be provided to one or more slaves.

TABLE 2

Exemplary Master Unit Command Set

| Sl No | Command | Code | Data | Remarks |
|---|---|---|---|---|
| 1 | All off | 00 | -\|-- | Command to switch off all slaves |
| 2 | All on | 01 | --- | Command to switch on all slaves |
| 3 | Toggle | 02 | --- | Toggle on off status of all slaves |
| 4 | Load | 03 | Red\|Green\|Blue | Load the color value |
| 5 | Rename | 04 | PAdr:NAdr_- | Rename the selected slave |
| 6 | Delete | 05 | PAdr\|-\|- | Delete selected slave |
| 7 | Reload Program | 06 | PgmNo\|-\|- | Reload the present program from slave memory |
| 8 | Smoothen | 07 | 0/1\|-\|-\| | To make the intensity change smooth |
| 9 | Init | 08 | 0\|0\|0\| | |
| 10 | Future use | 09 | | |
| 11 | Future use | 0A | | |
| 12 | Future use | 0B | | |
| 13 | Future use | 0C | | |
| 14 | Future use | 0D | | |
| 15 | Future use | 0E | | |
| 16 | Future use | 0F | | |

Another exemplary embodiment comprises a lighting system wherein the predetermined binary command code comprises a start code for instructing the destination electronic device to initiate an action selected from the group comprising at least of: assigning one or more addresses to the destination electronic device; saving a user-defined color sequence; selecting a factory preset color sequence; and synchronizing timing between two or more destination electronic devices.

Figure 6A:
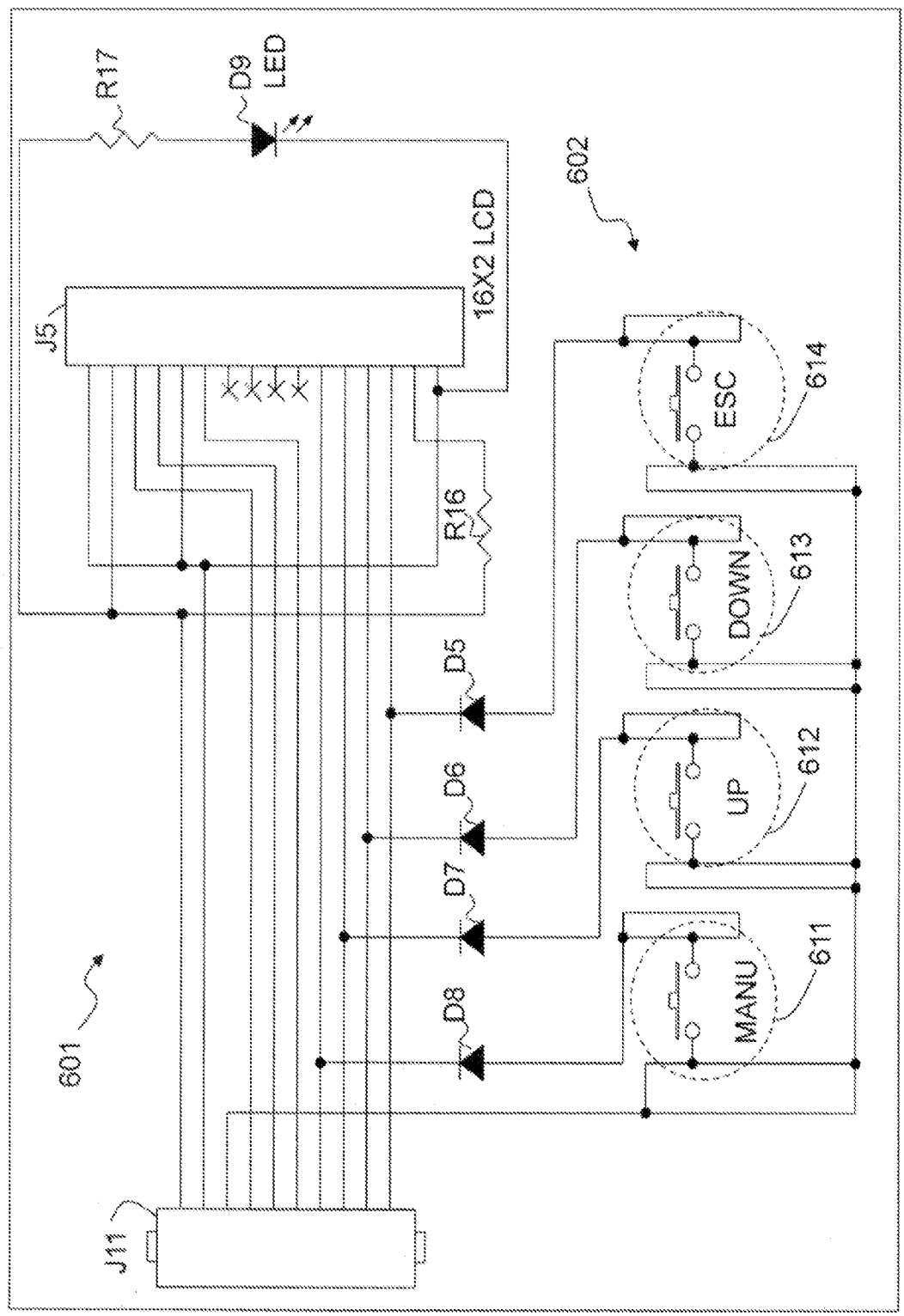
FIG. 6A illustrates an exemplary interface to circuitry of a keyboard.
Figure 6B:
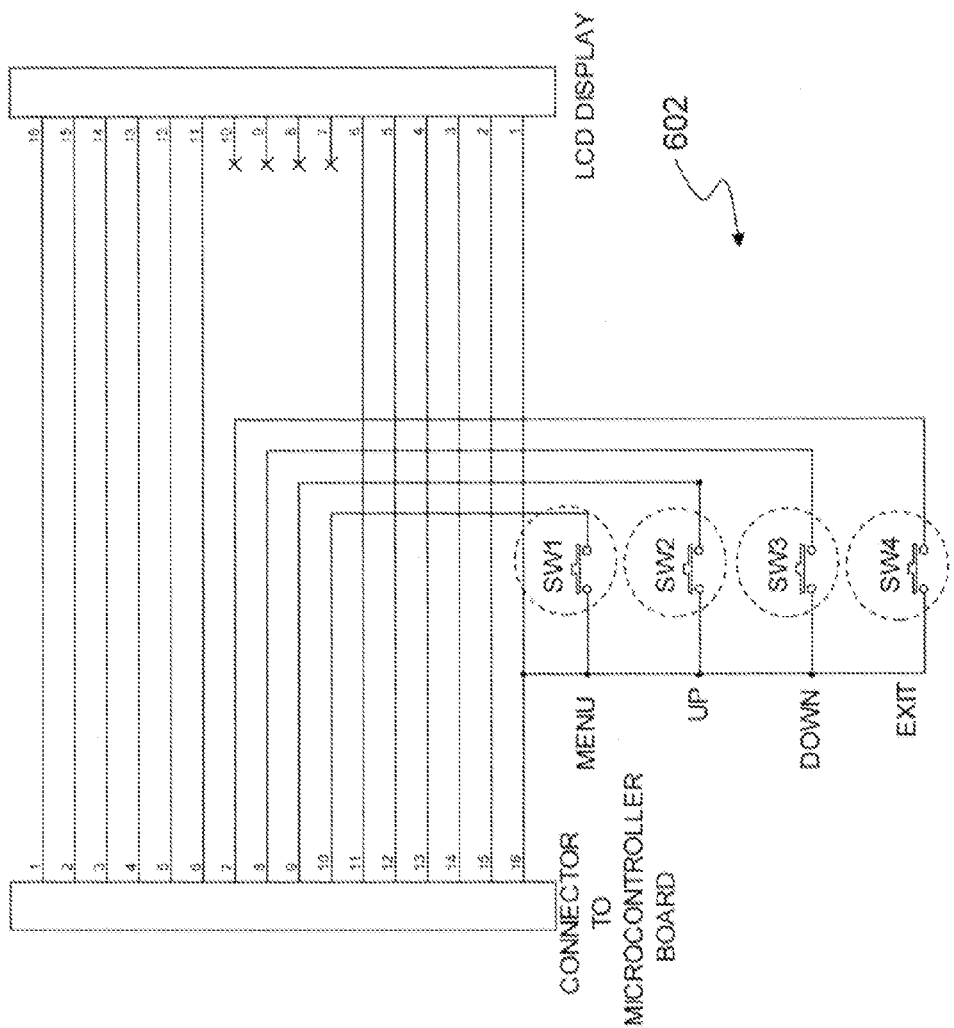
FIG. 6B illustrates an exemplary computer interface, interfacing with a master control unit.

FIGS. 6A-6B illustrate an exemplary LCD circuitry 601 and keyboard circuitry 602, configured via connectors J11 and J5, for interfacing to a master microcontroller 242 (FIG. 3). An exemplary four-button keyboard 602 comprising four switches, 611-614 and diodes D5, D6, D7 and D8, are depicted in the lower portion of the illustration. The LCD display user interface 601 is depicted in the upper portion of the illustration as a 16 ch×2 line display also comprising resisters R16 and R17 and LED D9. The display and the buttons may be arranged on a separate printed circuit board (PCB) for easy mounting and use. The keys may be placed close to the display in such a way that all the four keys may be arranged in a line close to the bottom of the LCD. The bottom line of the display may indicate the function of the user keys. User keys may be context sensitive and may be configured so that a particular user key function varies with the menu selected (see FIGS. 8A-8C). Accordingly, a user may set the parameters by using these four buttons and the LCD.

Figure 6C:
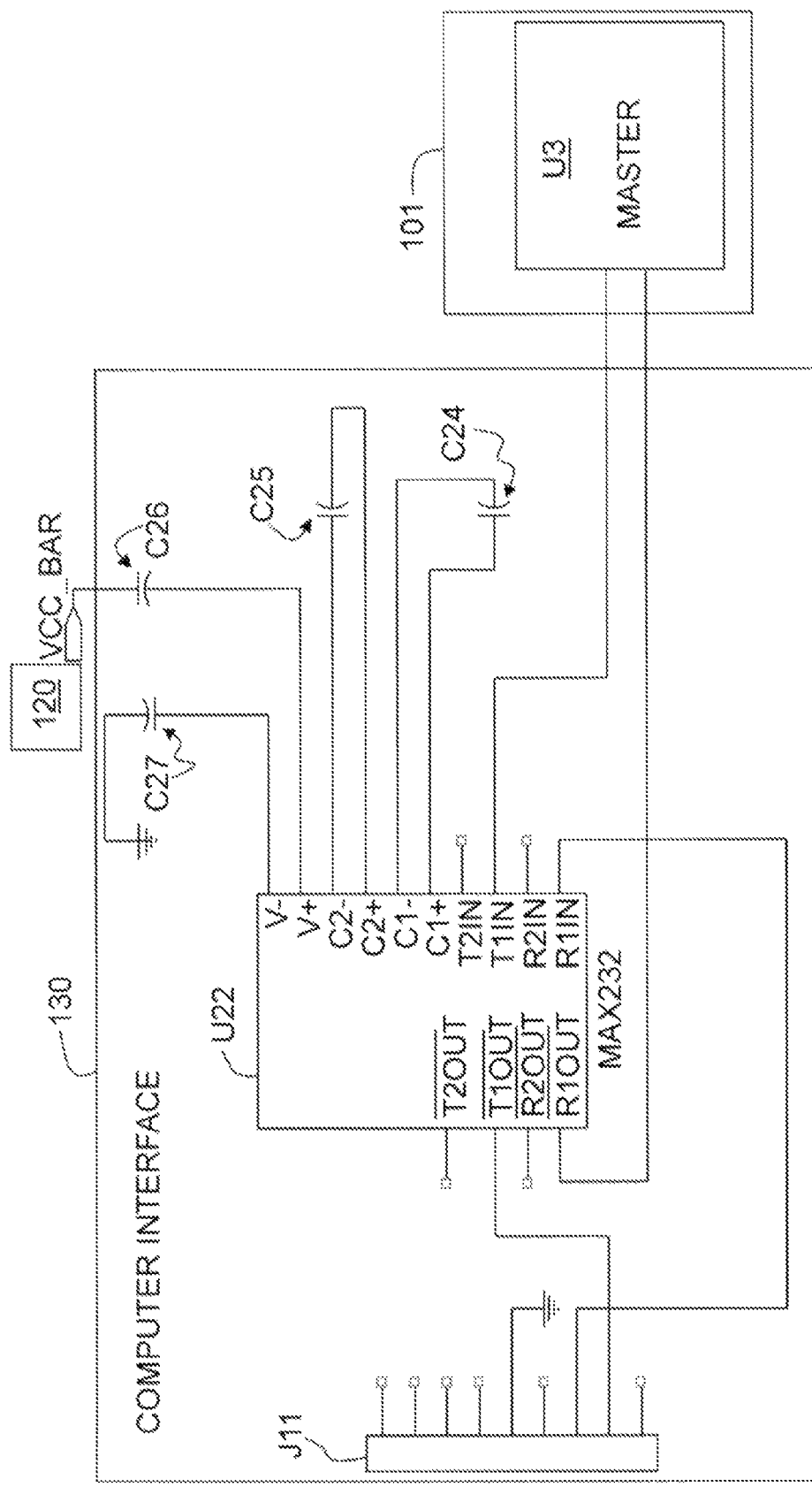
FIG. 6C illustrates an exemplary computer interface.

FIG. 6C illustrates exemplary circuitry comprising an integrated circuit U22, connector J11, capacitors C24, C25, C26, and C27, functioning as a computer interface 130 control that may be attached to the master 101 (FIG. 1) and that may provide for a WINDOWS™-based graphic user interface (GUI) environment. Via the GUI, the user may program one or more modes into the master control unit 101. Some embodiments of the GUI display to the user may be similar to the color marquee pattern or lighting result that may be observed at the slave LEDs. In some embodiments, the user may input modification commands and observe desired GUI-displayed lighting results, and may then effect a command to load the modified or selected modes into the master control unit 101. A user specific color selection may be possible which may enable the user to change the settings from long distances. As depicted by example in FIG. 6B, two I/O pins of the master 101, particularly two I/O pins of the microcontroller UART, U3, may be used for this connection to the GUI interface (FIGS. 1B and 1C). FIG. 6C illustrates that the microprocessor may be programmed to function as a UART and may be implemented in a program that may communicate to the computer user interface through port pins. An integrated circuit, such as a level converter, may be used to interface the UART signals to the com port, e.g., the IEEE RS232 C port, of the PC. A graphical user interface (GUI) may be executed via the user computer and display, and via the GUI, the user may communicate and control various modes of the system. Settings of various modes may be done with simple mouse clicks. A color palette may be displayed on the screen from which the user may select a color for every slave (FIGS. 1B and 1C). Connectivity between the master and the slave may be done via a wireless system with the use of suitable RS232 to radio frequency (RF) converters.

Figure 7:
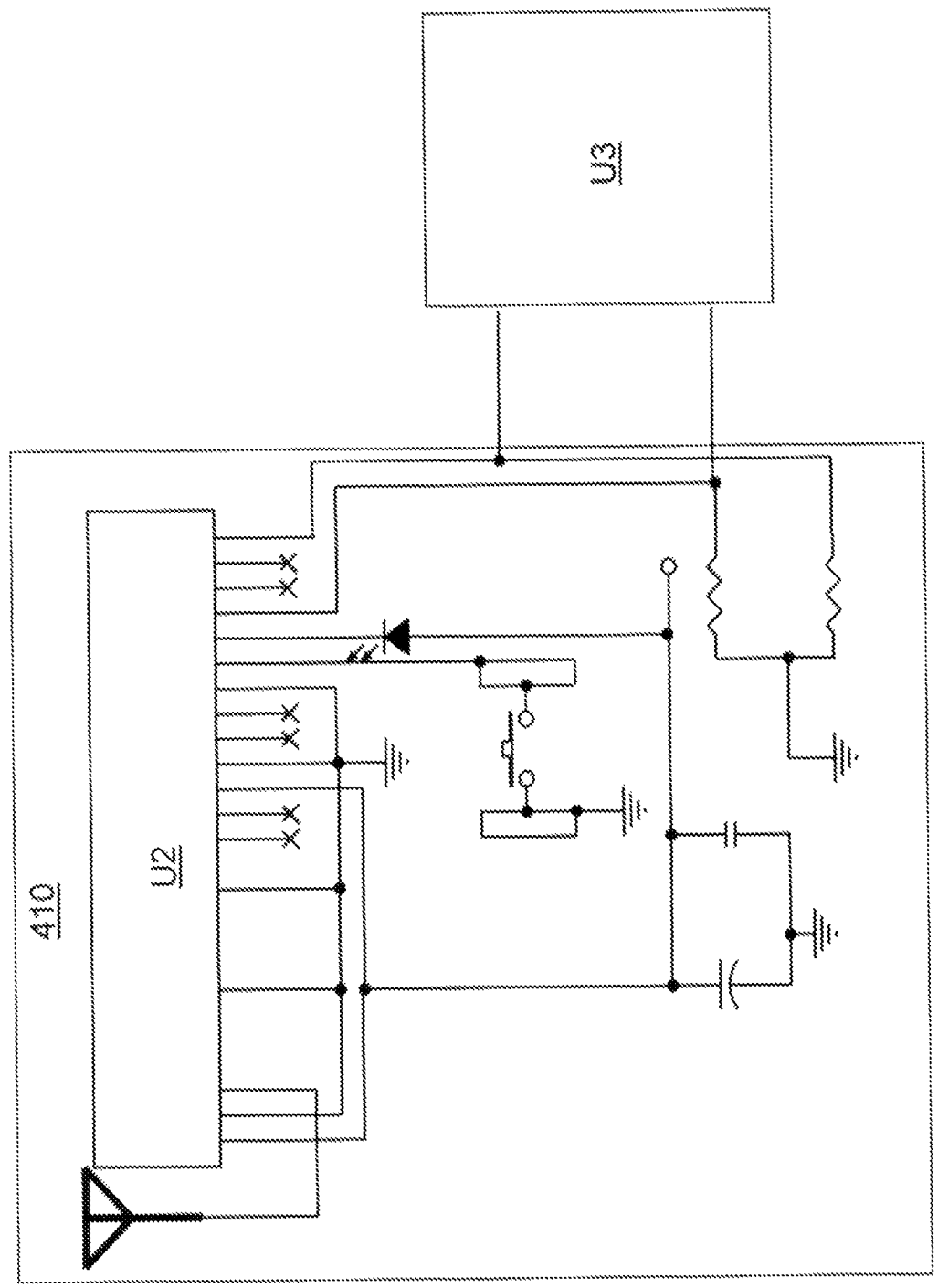
FIG. 7 illustrates an exemplary radio frequency (RF) interface, interfacing with a master microcontroller.

FIG. 7 depicts the radio frequency (RF) remote control circuitry 410 that may be part of the master unit (FIG. 4A) and in communication with the UART U3 of the microcontroller module 242. A user may change the menus by using a remote two-button transmitter (not shown). When using the RF remote 410, the messages and responses of the key presses may be conveyed to the user through the lighting of LEDs in the slave units, thereby facilitating the remote user to change the settings at a distance from the LCD display.

Figure 8A:
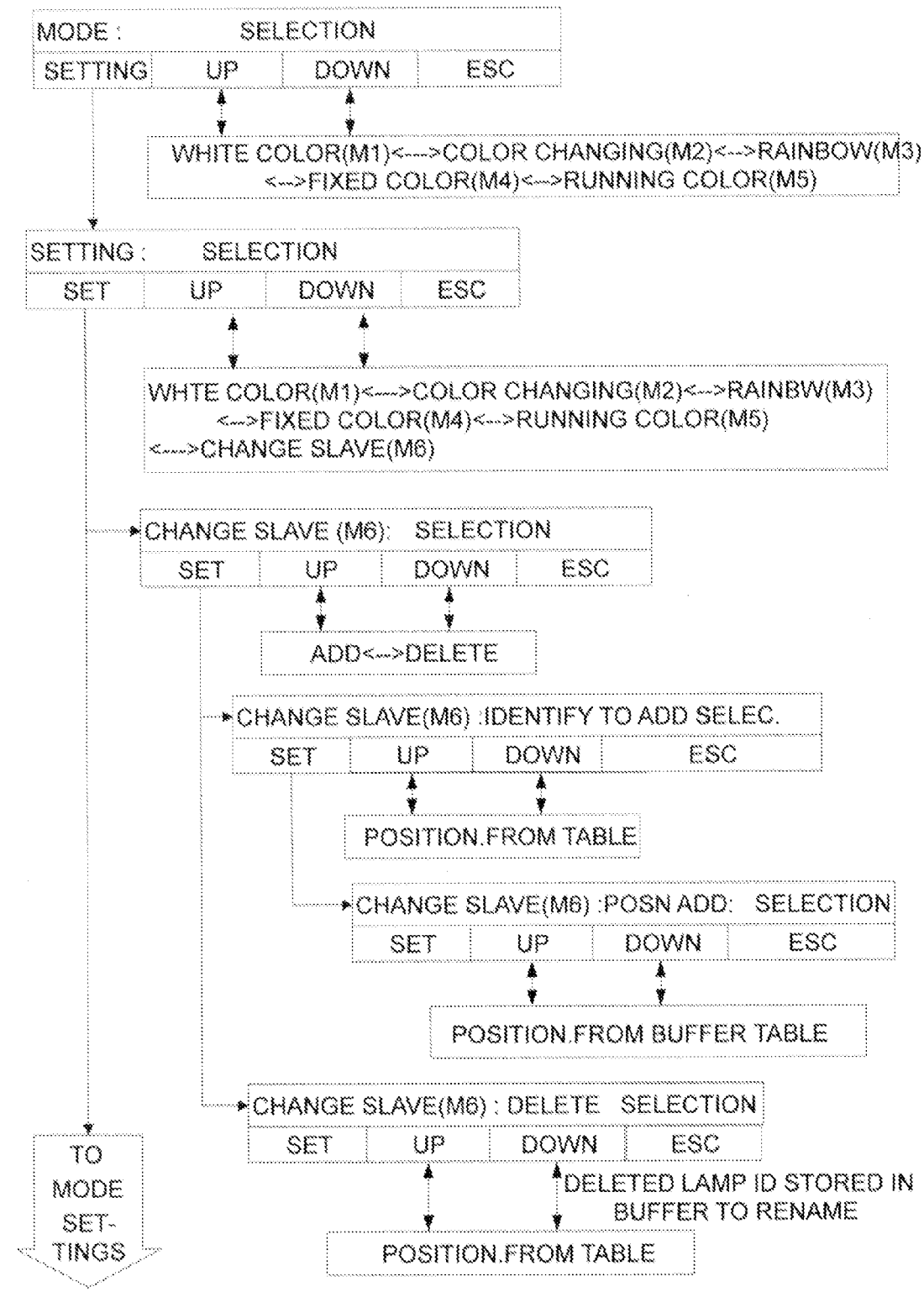
FIGS. 8A-8C illustrate exemplary selectable/mode flowcharts.
Figure 8B:
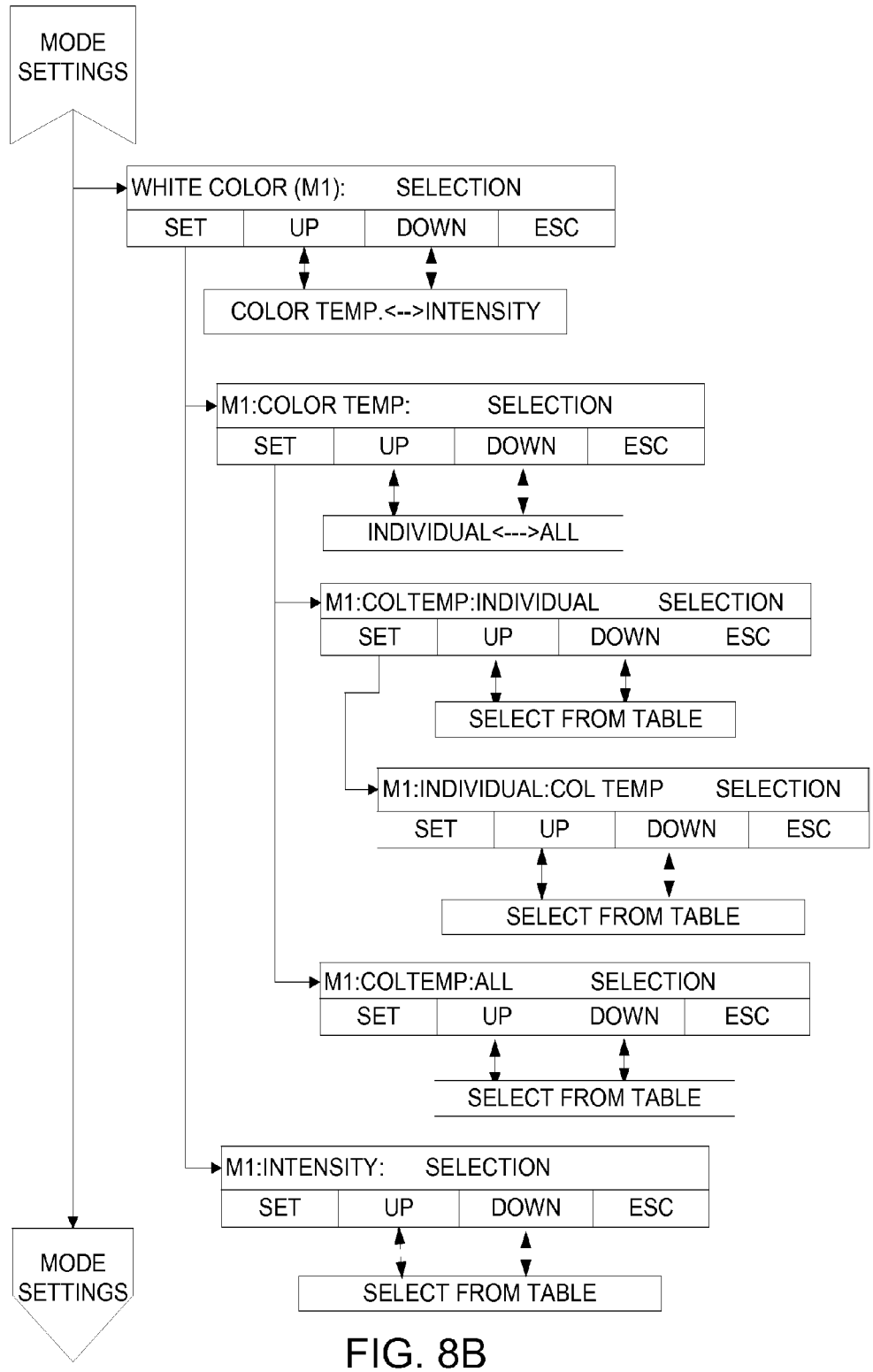
Figure 8C:
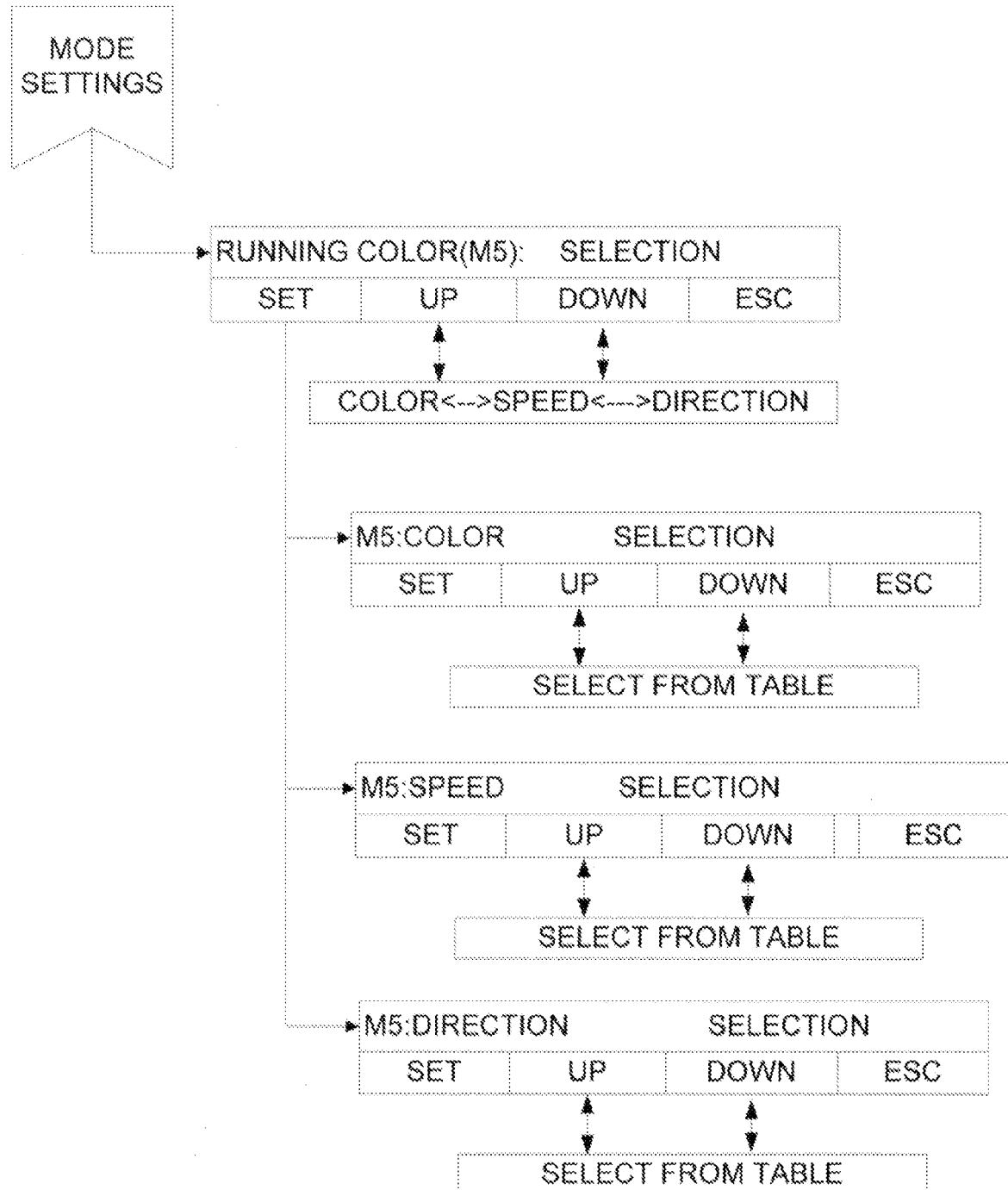

Commands may be encoded by way of a user interface 601 (FIG. 6A) and provided to the microcontroller module 242 (FIG. 4A). Noting the designations in FIG. 6A for the "MANU" button 611, the "UP" button 612, the "DOWN" button 613, and the "ESC" button 614, FIGS. 8A, 8B, and 8C provide exemplary command control logic via a hierarchical flow chart of modes. Accordingly, these flow charts (FIGS. 8A-8C) depict an exemplary user interface with the master control unit 101 (FIG. 1), and a method of selecting a particular menu and a method of setting variables in sub-menus.

Slave Units

Figure 9:
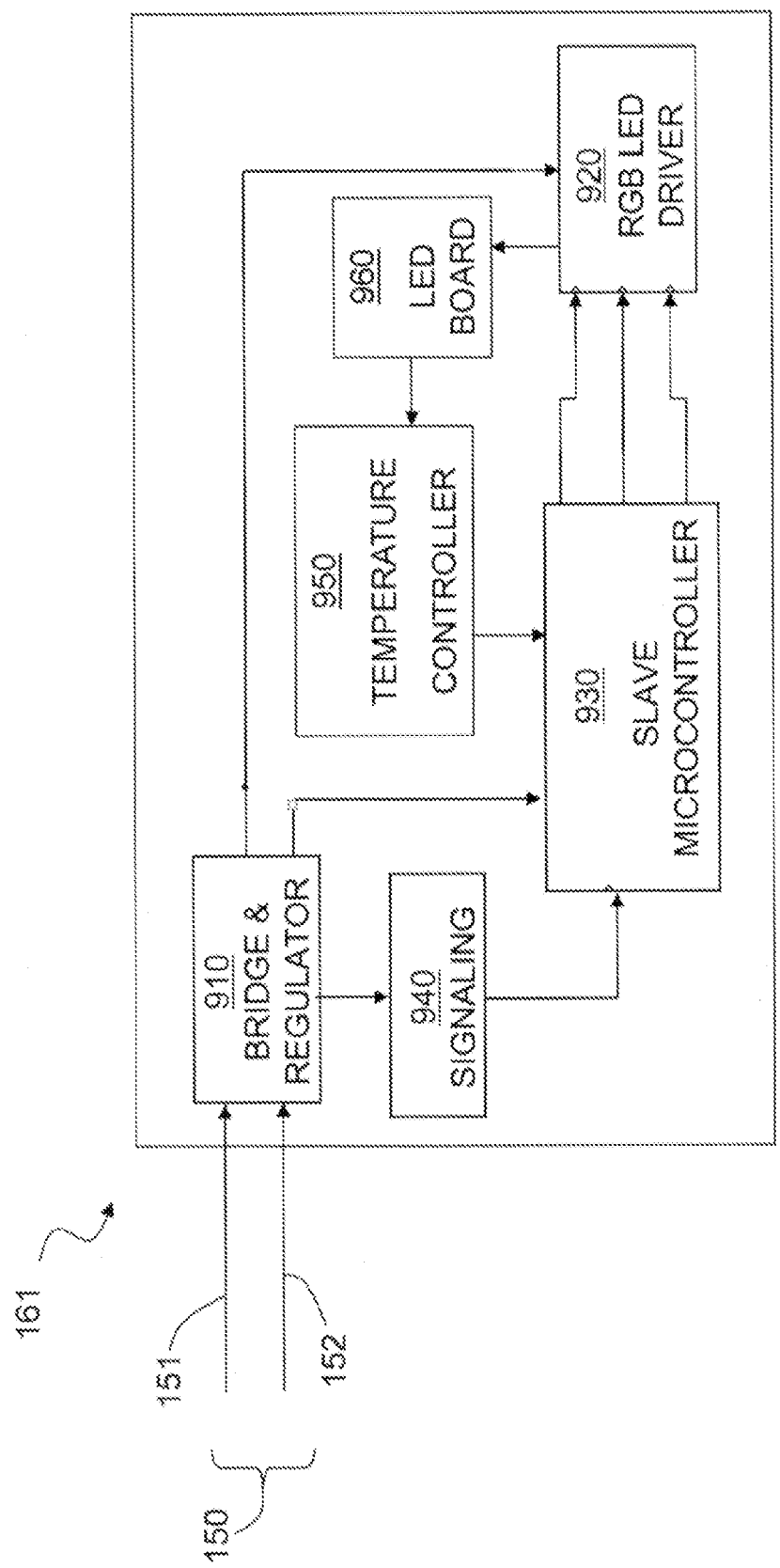
FIG. 9 is an exemplary top-level functional block diagram of a slave unit.

FIG. 9 is an exemplary top-level block diagram of the slave unit 161, powered from the first line 151 and the second line 152 (FIG. 1) from the master control unit 101 to the slave, comprising bridge and regulator circuitry 910, signaling circuitry 940, slave microcontroller circuitry 930, an LED, e.g., RGB LED, driver circuit 920, LED board circuitry 960, and temperature control circuitry 950. FIG. 9 depicts the slave microcontroller 930 receiving communication signals and/or power signals from the bridge and regulator module 910, the signaling module 940, and the temperature controller module 950. Various types of lighting effects may be possible by selectively turning on and off the LEDs in the slaves particularly by the master sending "switch off" commands to particular slaves. For example, a marquee effect may be generated by sequentially turning on and off the slaves by sending commands and addresses to the slaves by the master.

Figure 10A:
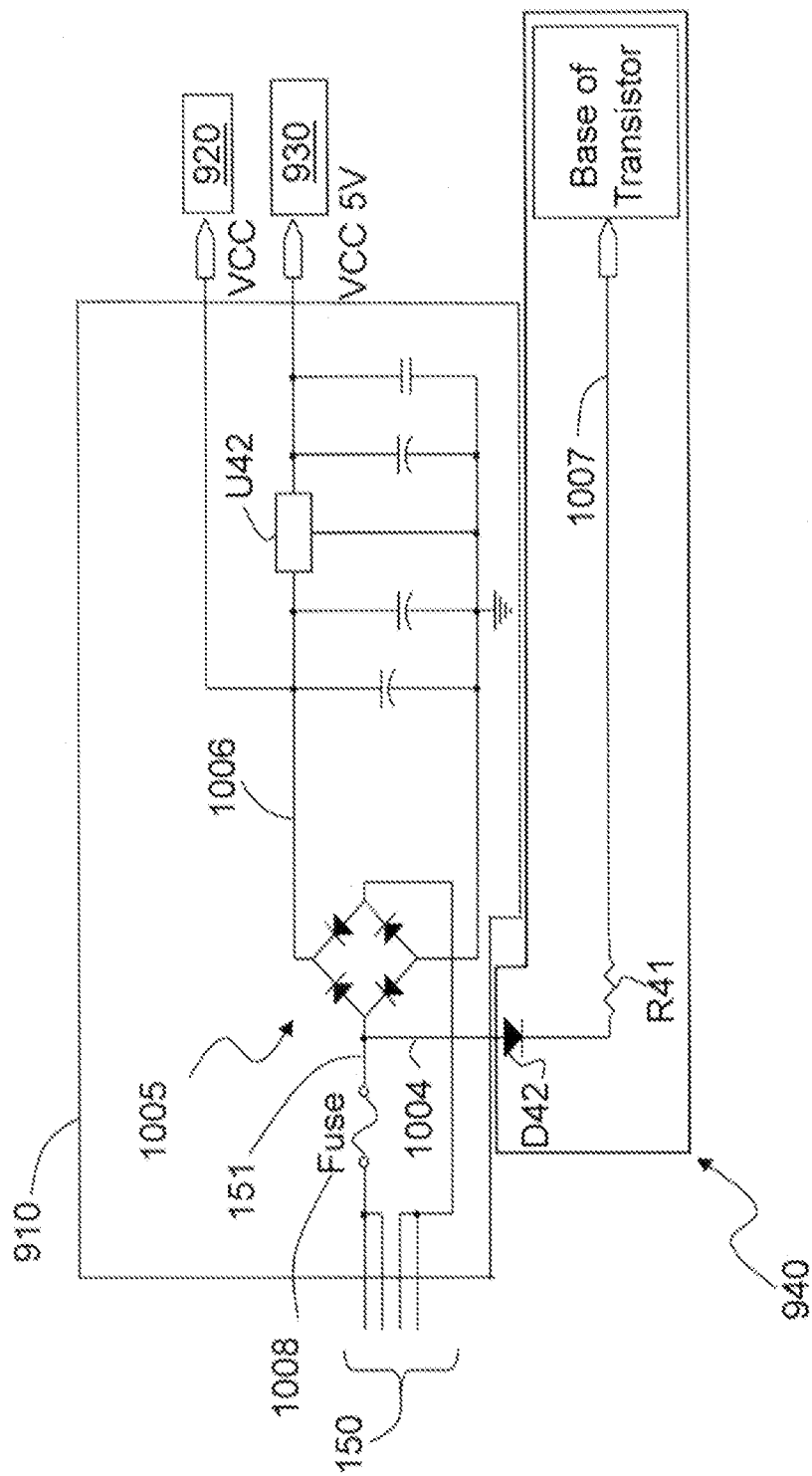
FIG. 10A is an exemplary signaling schematic of a bridge and regulator of a slave unit.

FIG. 10A illustrates an exemplary schematic where an output 1006 of the diode bridge 1005 is provided to an integrated circuit U42, that may be a 7805-type voltage regulator that in turn generates a 5 V DC that may be available to the slave microcontroller 930, including a fuse 1008, e.g., a thermal fuse. FIG. 10A also illustrates a configuration for signaling 940. That is, ahead of the diode bridge 1005, the line, e.g., Line A 151, may be tapped 1004 and a diode D42 and resister R41 may be disposed in series and the output 1007 may be provided as a base voltage of a transistor. The voltage polarity of the output 1007 may be applied as an indicator of master data bits by being used as a bias for a switching transistor.

Figure 10B:
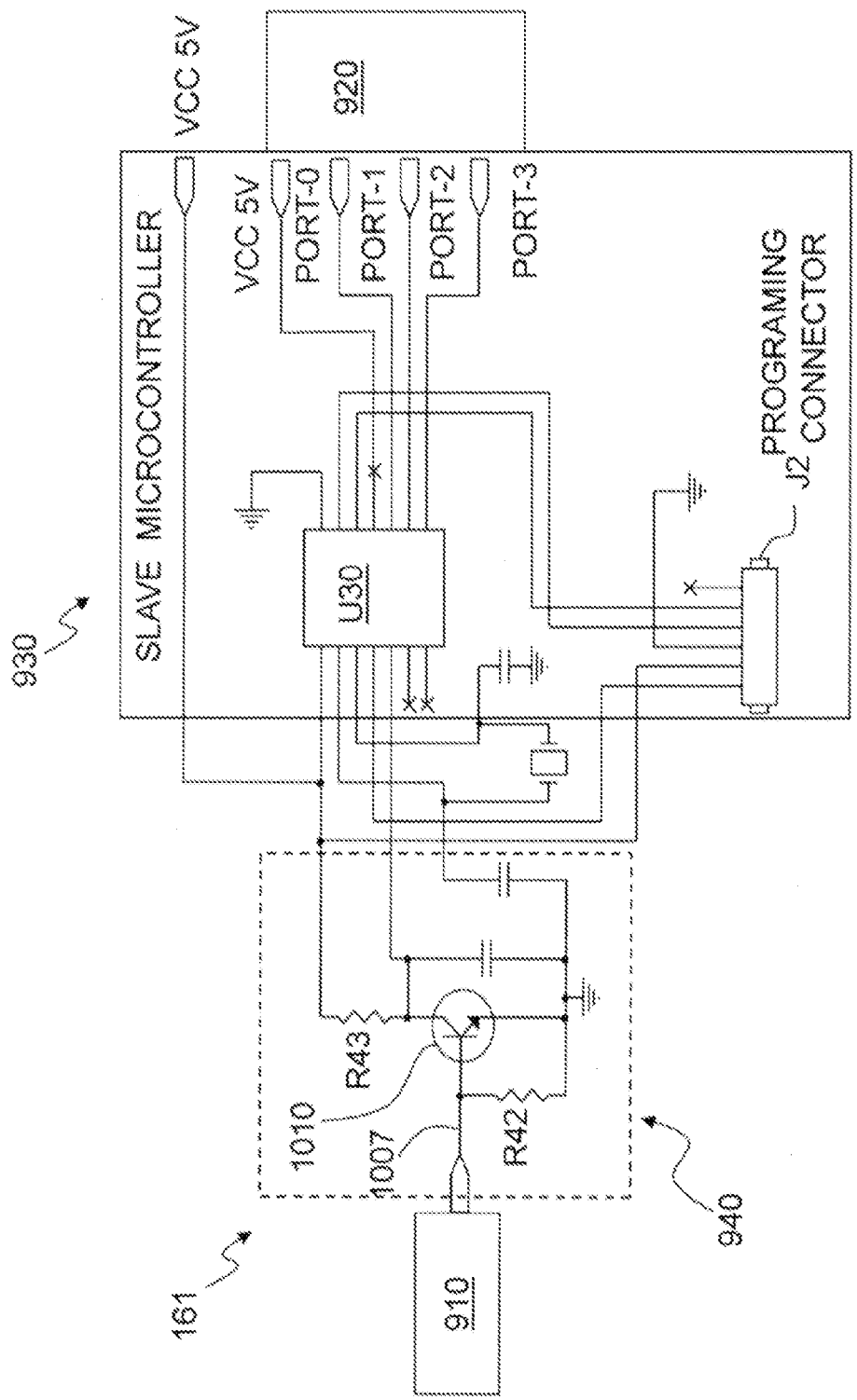
FIG. 10B is an exemplary portion of a signaling schematic interfacing with a slave microcontroller.

FIG. 10B shows an exemplary schematic of the microcontroller module 930 of a slave unit 161. The microcontroller module 930 may be embodied as comprising a Microchip PIC16F688 PIC microcontroller unit (PIC MCU) U30, to receive and decode the data transmitted by the master control 242 via the DC bus 150. The microcontroller U30 may generate a pulse-width modulated (PWM) frequency of around 200 Hz to control an LED drive circuit, for example, an RGB LED drive circuit 920. The PIC MCU system clock may be at 8 MHz. PWM signals to drive three LEDs may be made available at three port pins, e.g., PORT_1, PORT_2, and PORT_3. Connector J2 is depicted, by example, in FIG. 10B as a connector that may be used to connect the programmer and may be used in circuit serial programming (ICSP). As to the signaling 940, the tapped voltage output 1007 may be used to bias the switching transistor 1010. For example, when a logical "Low" is transmitted via the polarity arrangement between the two power lines, e.g., FIG. 5 where Line A 151 is −12V and accordingly Line B 152 is +12V, this transistor will be forward biased, and its collector voltage would typically be expected to approach zero volts. The effect of the collector voltage drop may be to insert a logical "Low" to a pin, for example, the RXD pin, of the slave microcontroller U30. Likewise, when a logical "High" is transmitted via the polarity arrangement between the two power lines, e.g., FIG. 5 where Line B 152 is −12V and accordingly Line A 151 is +12V, the collector goes to a logical zero, i.e., "0." This logic signal is given to the UART input of the slave microcontroller. So when a "0" is transmitted from the master using its UART, the H-bridge switches as explained above for the master microcontroller, and this in turn causes Line A 151 to become +Ve. This +Ve voltage at Line A 151 causes the polarity detector circuit comprising diode D42 and resister R41 (FIG. 10A) and transistor 1010 (FIG. 10B) to detect the polarity and output a logic signal of "0" to the slave microcontroller U30.

Figure 10C:
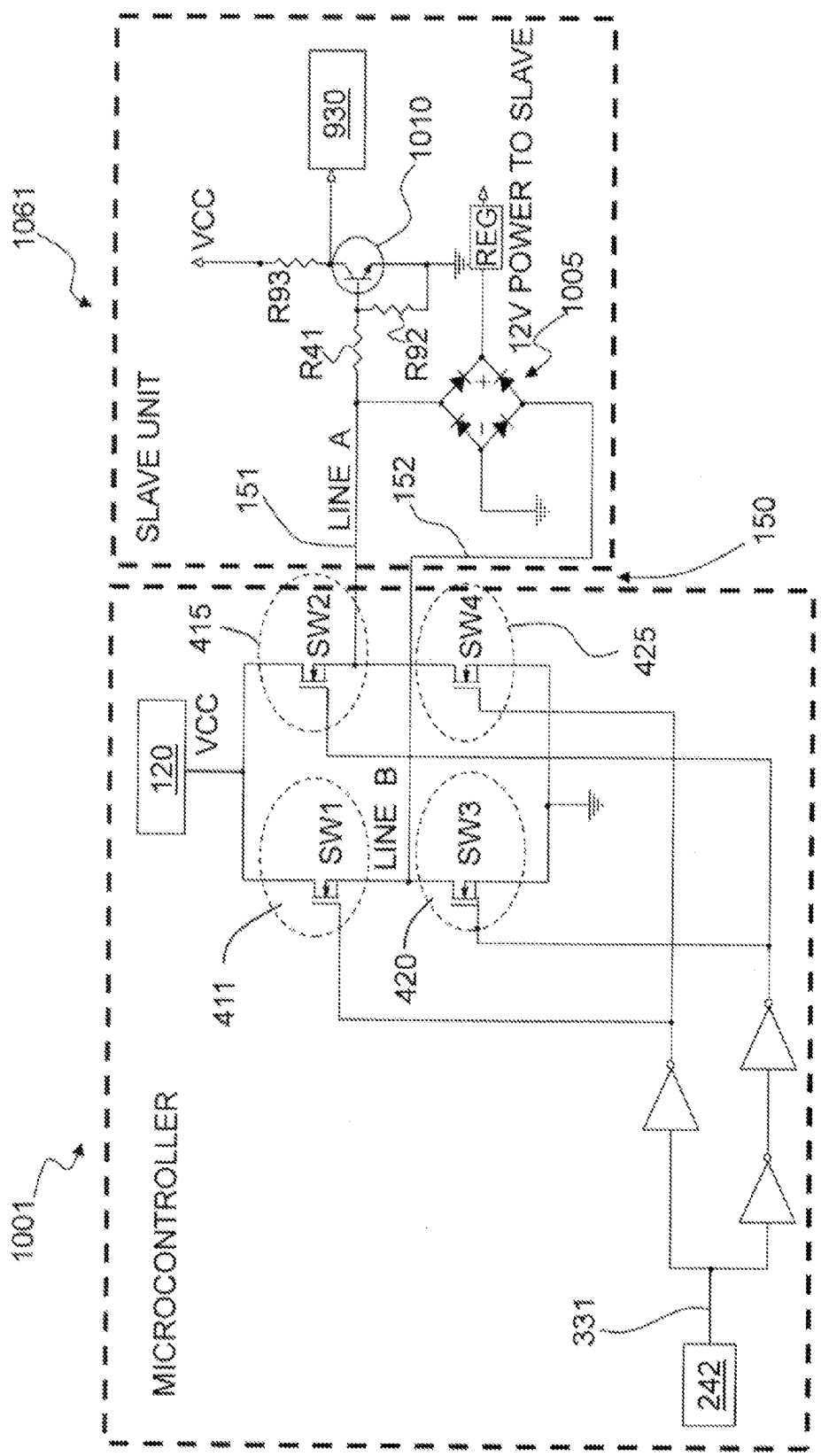
FIG. 10C is a simplified exemplary schematic illustrating the polarity switching and the detection of switched polarity of an embodiment of the present invention.

FIG. 10C illustrates a portion of the master control unit 1001 in communication with and providing power to a portion of the slave unit 1061 via the DC bus 150, the DC bus 150 comprising Line A 151 and Line B 152. As explained at FIG. 5, the polarity of each power line, i.e., Line A 151 and Line B 152, is opposite one another and alternates when logical zeros and ones are transmitted from the master microcontroller 242 (FIG. 2). An exemplary diode bridge 1005 may be configured at the slave unit to continue the delivery of 12V power to the slave unit.

Figure 11A:
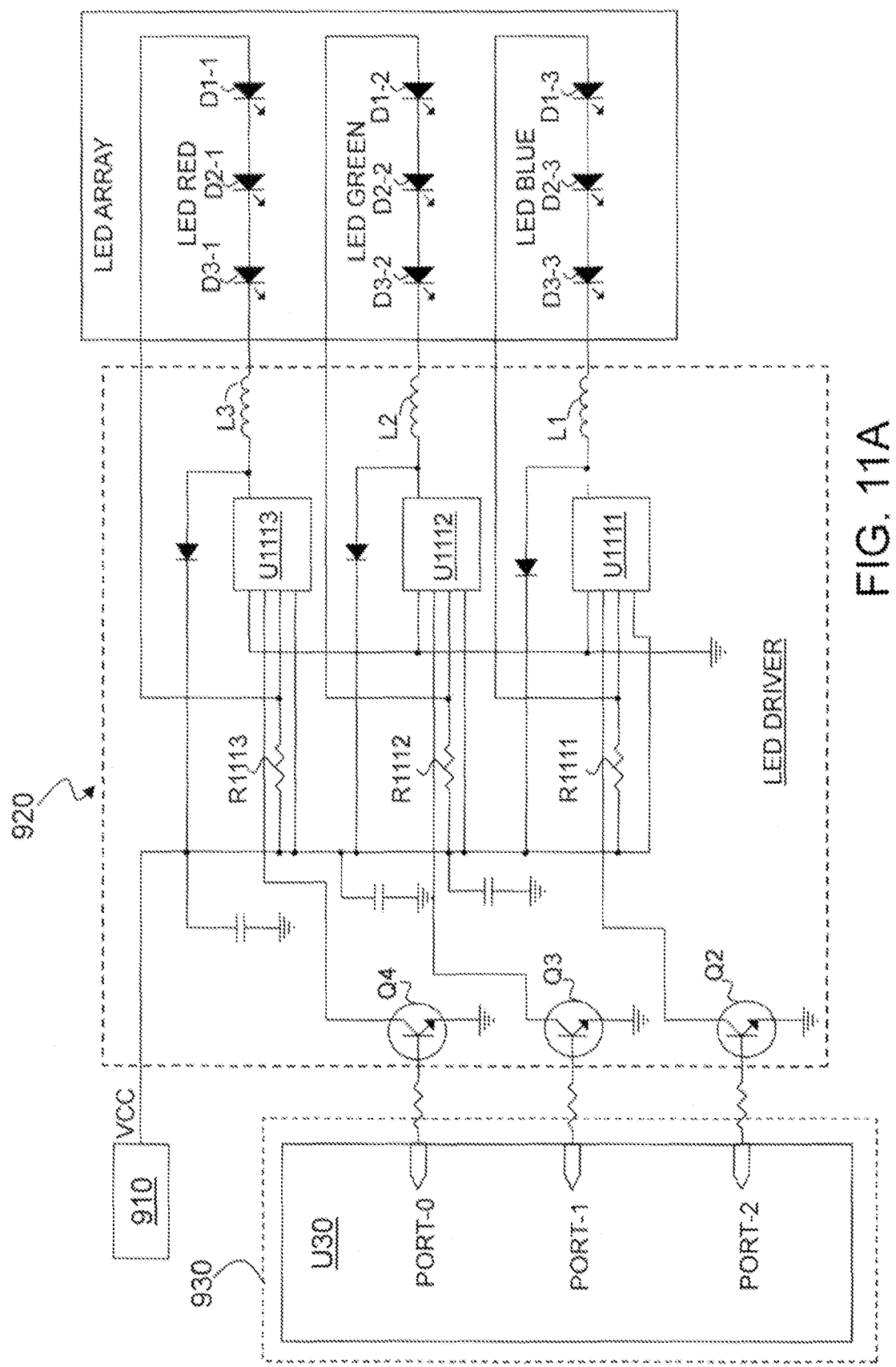
FIG. 11A is an exemplary RGB LED driver circuit.

FIG. 11A is an exemplary LED driver circuit 920 where this driver circuit 920 comprising integrated circuit elements U1111, U1112, and U1113, may provide a constant current drive to the LEDs which is turned on and off at a faster rate, i.e., flicker rate, and the duty cycle of the PWM cycle that determines the intensity of the PWM frequency may be selected such that the flicker is not noticeable due to the persistence of the human eye, for example. The PWM output from the slave microcontroller U30 is fed to the LED drivers 920 using transistors Q4, Q3, and Q2 for red, green, blue LEDs respectively. The LED driver chip ZXLD1362 from ZETEX™ functions as a buck mode switching regulator. The LED current is sensed by using R1113, R1112 and R1111 for red, green, and blue LEDs respectively. Voltage developed across this resister is fed back to the LED driver for current regulation. Accordingly, it is possible in some embodiments of the present invention to set the LED current by changing the value of the sense resister using the relationship:

$$I\text{out}=(0.1/R\text{sense})\text{Amps (1)} \quad [\text{Eq. 1}]$$

Accordingly, each unique color LED driven via a separate driver allows for the control of intensity and by adjusting the intensity of each basic color of the LED, the resulting color temperature or hue.

Figure 11B:
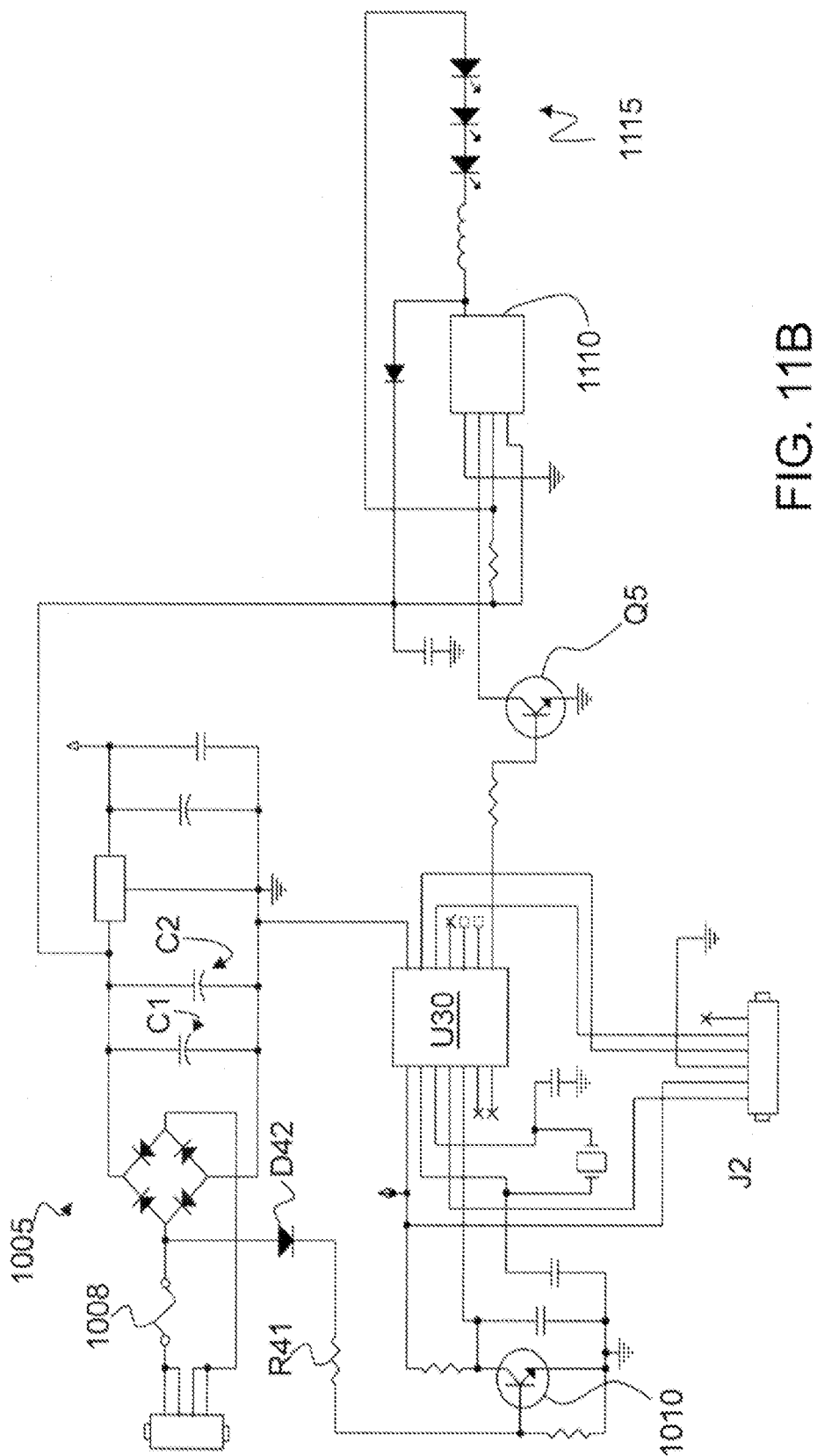
FIG. 11B is an exemplary white LED driver circuit.
Figure 11C:
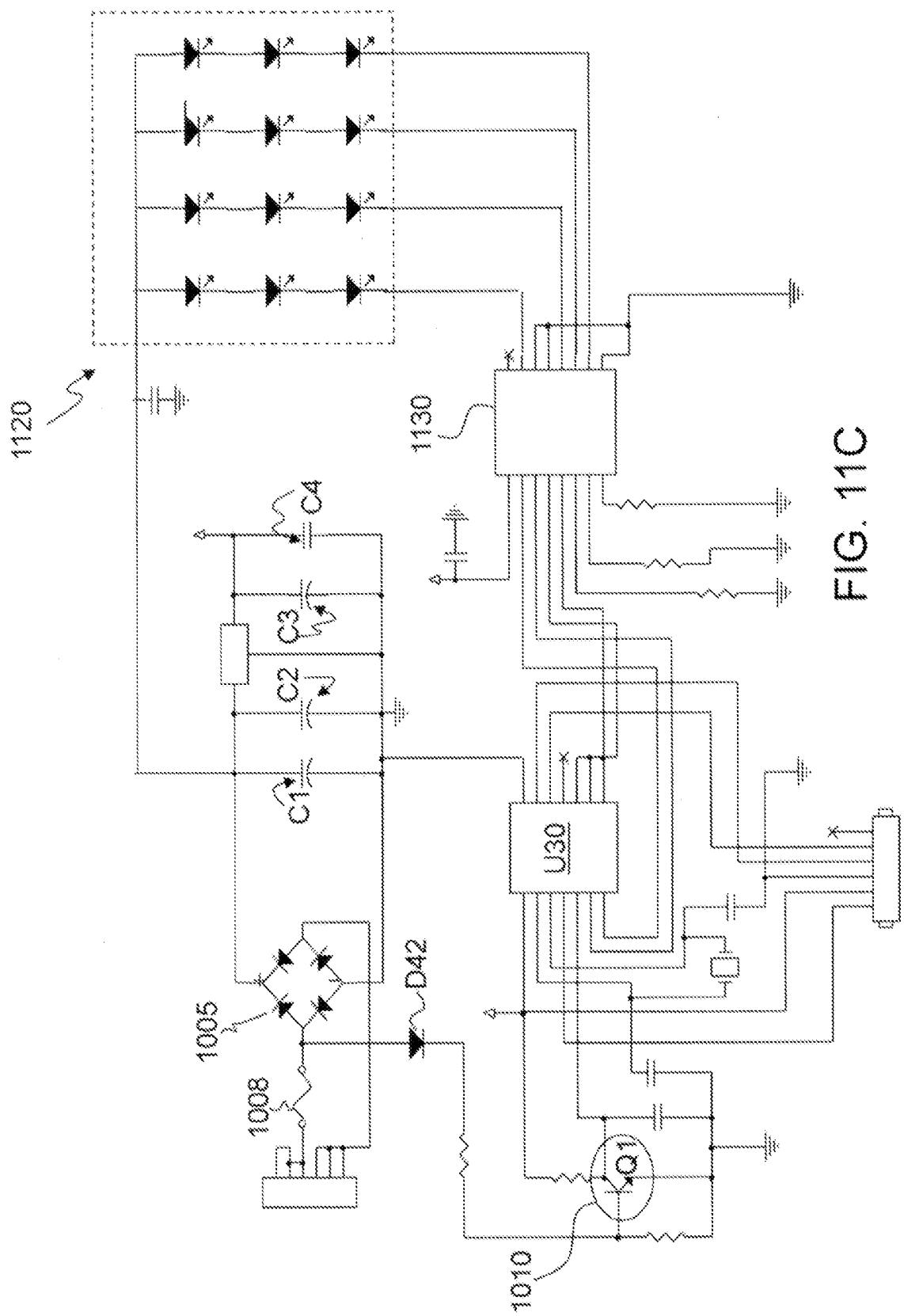
FIG. 11C is an exemplary RGBW LED driver circuit.
Figure 11D:
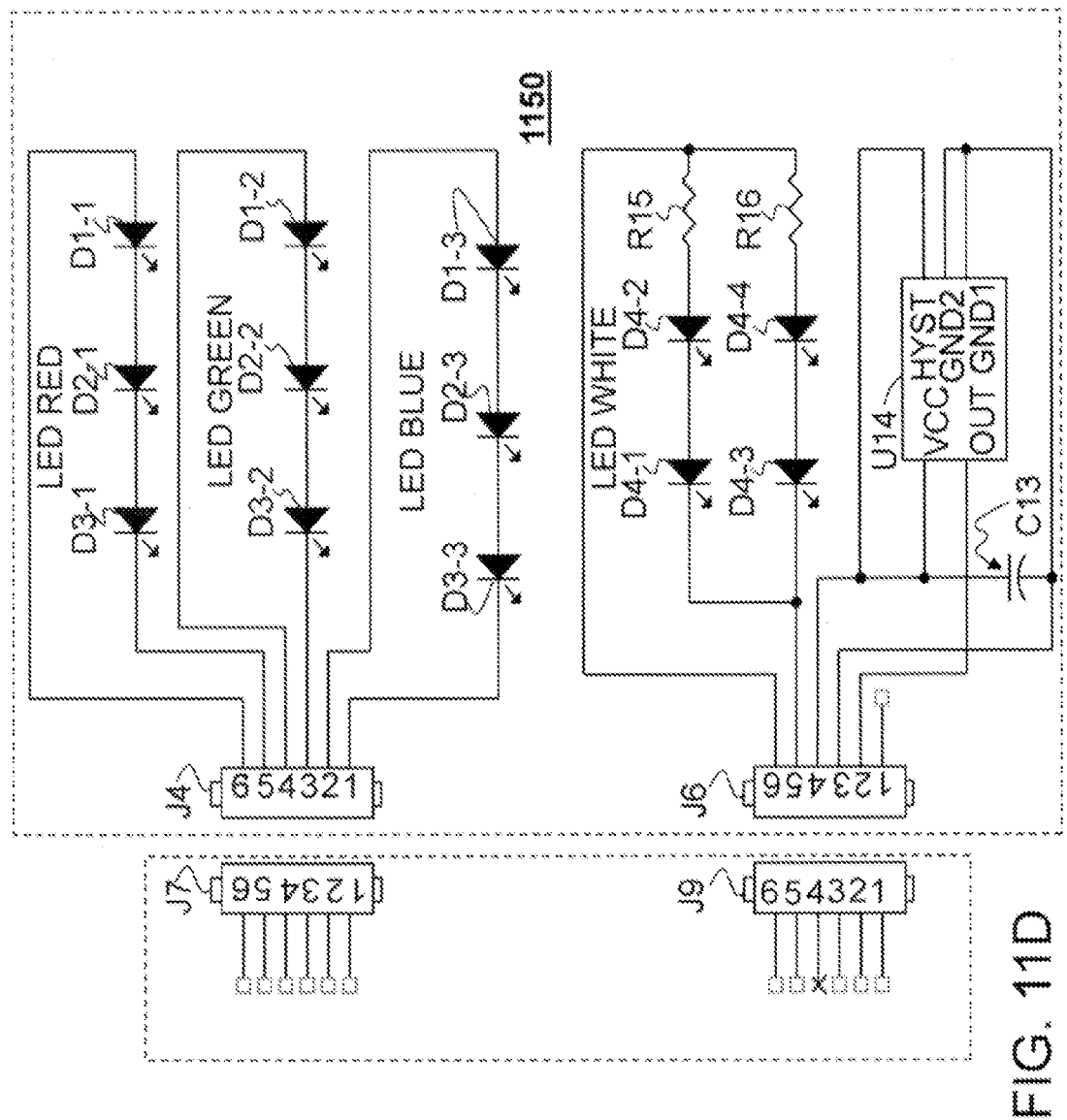
FIG. 11D is an exemplary RGBW LED board circuit.

FIG. 11B illustrates the PWM output from the slave microcontroller U30 is fed to the LED driver 1110 using transistor Q5, Q3 (FIG. 11A), and Q2 (FIG. 11A) for white LEDs 1115. FIG. 11C illustrates for a slave unit exemplary red, green, blue, and white LEDs 1120 may be driven by a UART 1130 comprising both transistors (Q2-Q5) and drivers. FIG. 11D illustrates an LED array 1150 where the red, green, and blue LEDs may be driven open loop and white LED may be driven with closed-loop feedback provided by a chip U14.

FIG. 12 illustrates for a slave unit exemplary temperature control or monitoring circuitry 950 that may be applied in monitoring a temperature of a circuit and for protecting the circuit from excessive heat. The LEDs are sensitive to temperature changes. If the LED overheats, the LEDs may be damaged or the color may not correctly blend. So, in order to avoid degradation and/or permanent failure of the LEDs, a temperature monitoring circuit may be used. This exemplary circuit is built around the IC U113 which gives out a logic "0" when the temperature exceeds a set limit. This integrated circuit chip may be mounted on the LED board 960, i.e., a printed circuit board (PCB) so as to measure the temperature of the LEDs as conducted through the copper clad on the PCB. Upon receiving a logical "Low" at the port input of the slave controller, the slave controller may switch off the PWM module, and accordingly, all LEDs will be effectively switched off. The slave typically resumes its operation when the LED board temperature has returned to a safe limit. For the exemplary embodiment, particular as to the selected chip, the effective temperature sensitive may be that of a hysteresis of about 2 degrees Centigrade.

Figure 13:
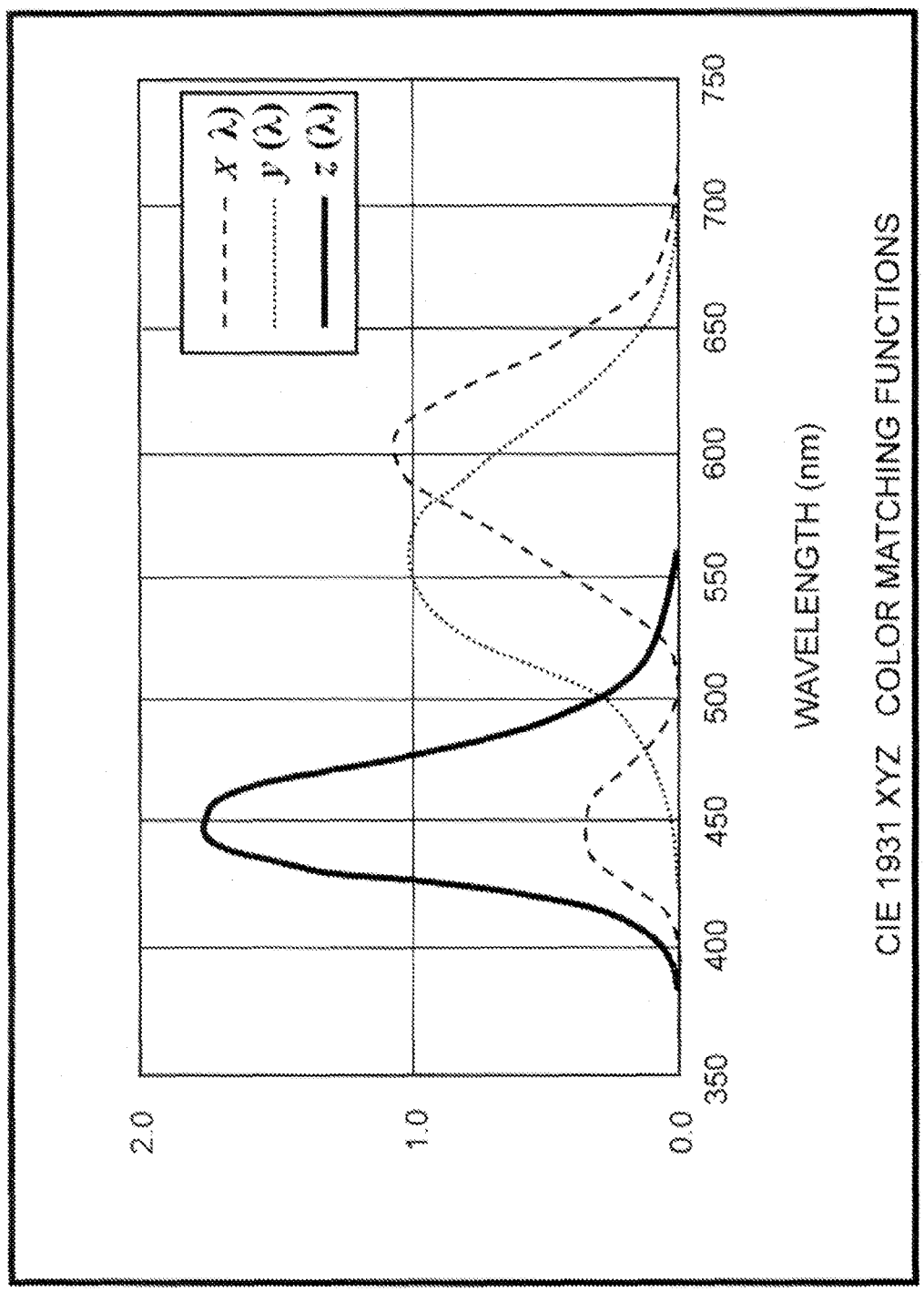
FIG. 13 is an exemplary diagram showing CIE 1931 XYZ color matching functions.

Several applications of a lighting product are expected to maintain a chromaticity shift for LED packages that, over time, should not exceed 0.007 on the CIE 1976. FIG. 13 references a 7-step MacAdam ellipse. The tristimulus system adopted by CIE may be based upon three primary color stimuli, corresponding roughly to the colors red, green, and blue. The color matching functions, X(Y), Y(Y) and Z(Y) may be used as weighting functions for a given spectral radiant flux distribution. A given spectral flux distribution (which may be spectral radiant flux, spectral radiance, or spectral irradiance) may also be called a color stimulus, as shown here by Q(λ). By conducting three integrations of Q(λ) over a visible spectrum, with each of the spectral weighting functions $\bar{x}(\lambda)$, $\bar{y}(\lambda)$ and $\bar{z}(\lambda)$, one may obtain three color coordinates X, Y, Z that uniquely characterize the color of the stimulus spectral Q(λ):

$$X=k\int Q(\lambda)\bar{x}(\lambda)d\lambda \quad [\text{Eq. 2.1}]$$

$$Y=k\int Q(\lambda)\bar{y}(\lambda)d\lambda \quad [\text{Eq. 2.2}]$$

$$Z=k\int Q(\lambda)\bar{z}(\lambda)d\lambda \quad [\text{Eq. 2.3}]$$

The three quantities X, Y, Z may be referred to as tristimulus values for the source spectrum Q(λ). They uniquely characterize the color of this spectral distribution of light.

To simplify the analysis of colors within this system, a simple transformation may be applied to normalize the above quantities. X, Y, and Z, may be replaced by x, y, and z, respectively as follows:

$$x = \frac{X}{X+Y+Z} \quad [\text{Eq. 3.1}]$$

$$y = \frac{Y}{X+Y+Z} \quad [\text{Eq. 3.2}]$$

$$z = \frac{Z}{X+Y+Z} \quad [\text{Eq. 3.3}]$$

The resulting transformed values x, y, and z may be called chromaticity coordinates since they are used to locate a point in three-dimensional color space. As a result of this normalization x+y+z=1, and what may have been a three-dimensional color space, might be transformed into a two-dimensional one. Since z=1−x−y, only x and y have to be specified to designate any color in this system uniquely, for depiction of CIE tristimulus color space. It may also be called chromaticity.

With this system of color specification, the monochromatic color may lie on a locus surrounding and bounding an area of an x-y plot of color points. A monochromatic color may be represented by letting the stimulus Q(λ) in equations 2.1-2.3 (see above) be 1.0 for some wavelength λ and 0.0 for all others. The boundary of this area may be determined by replacing Q(λ) in the summation version of equations 2.1-2.3 with number 1.0 for some wavelength λ and zero for all others and using equations 2.1-2.3 and equations 3.1-3.3 to determine the coordinate (x'(λ), y'(λ)) of the corresponding monochromatic color on the x-y plot. The results $$x'(\lambda) = \frac{\bar{x}(\lambda)}{\bar{x}(\lambda)+\bar{y}(\lambda)+\bar{z}(\lambda)} \quad [\text{Eq. 4.1}]$$

$$y'(\lambda) = \frac{\bar{y}(\lambda)}{\bar{x}(\lambda)+\bar{y}(\lambda)+\bar{z}(\lambda)} \quad [\text{Eq. 4.2}]$$

If this calculation is repeated for each wavelength from 360 to 830 nm, the plot shown in FIG. 13 for the boundary of CIE tristimulus color space called spectral locus, may be obtained. Monochromatic wavelengths from 360 to 830 nm are shown in FIG. 13. The color white lies in the interior of this space around the point designated by the coordinates x=0.333 and y=0.333 If the color of the illuminant does not quite match that of any blackbody, then there may be a modification of the color temperature, called correlated color temperature The CIE colorimetric committee had developed following straight forward transformation of chromaticity coordinates (x, y, z) to UCS coordinate (u', v', w')

$$u' = \frac{4x}{-2x+12y+3} \quad [\text{Eq. 5.1}]$$

$$v' = \frac{9y}{-2x+12y+3} \quad [\text{Eq. 5.2}]$$

$$w' = 1 - u' - v' \quad [\text{Eq. 5.3}]$$

Figure 14:
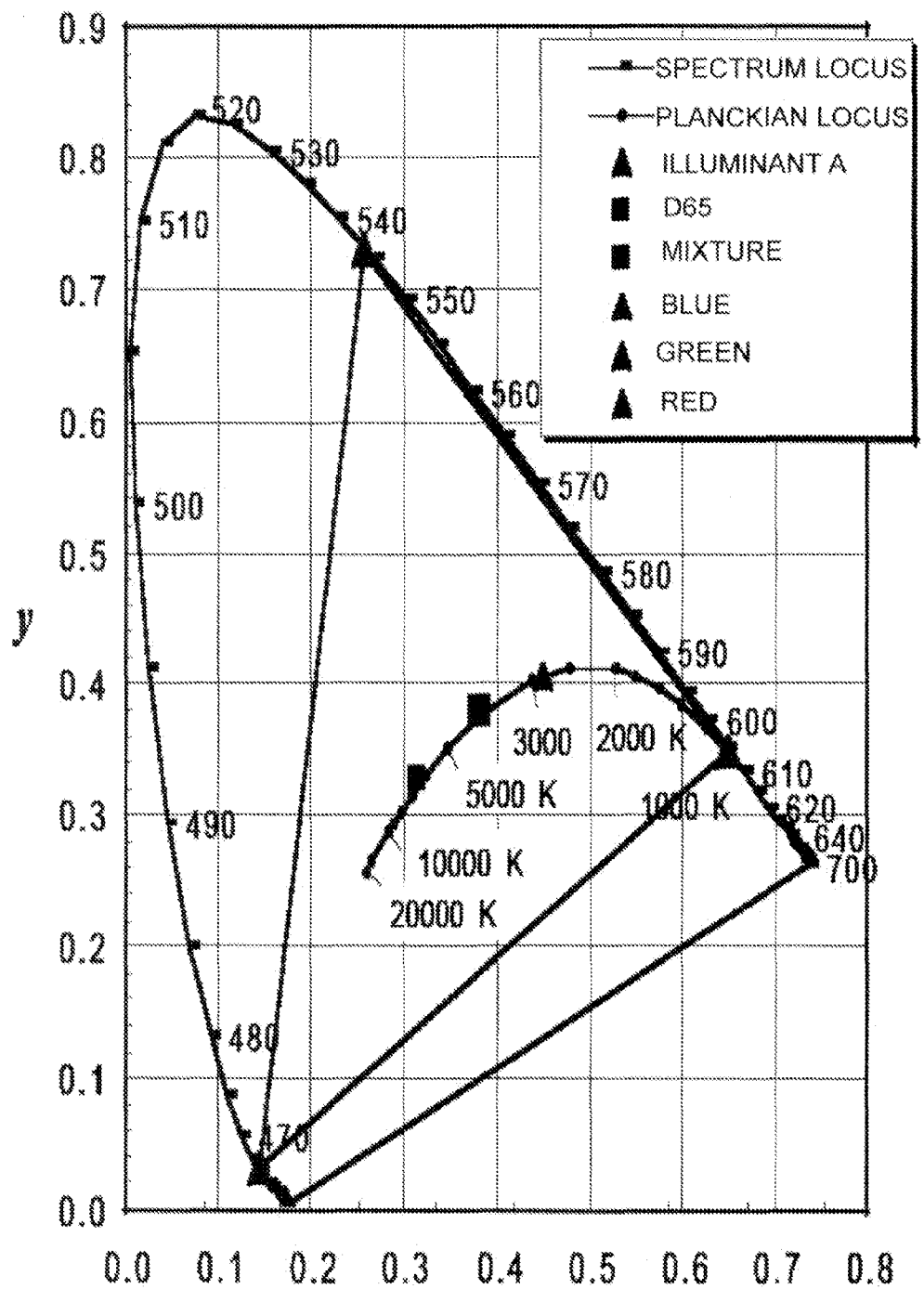
FIG. 14 is an exemplary CIE diagram of Y vs. X.
Figure 15:
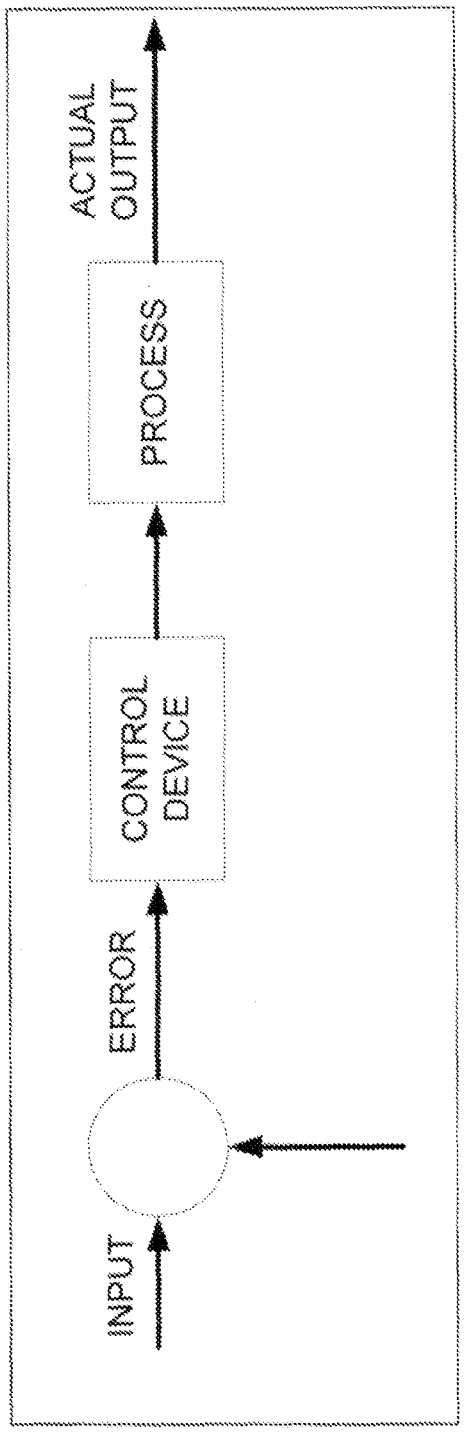
FIG. 15 is an exemplary open loop color balancing system.

Embodiments of the present invention may arrive at a white balance point after mixing RGB, as seen in FIG. 14. That white balance point might be a user selected color temperature or any color. There may be multiple ways in which a specific color balance may be achieved, to chromatically shift the LED packages over time, and to achieve visually acceptable control over a close range on the CIE 1976 (u', v') diagram (corresponds with a number of steps-MacAdam ellipse) may require a closed loop control system. In the present embodiments, an open loop system may be used as shown in FIG. 15 where the input are signals to driver circuits as the control devices, the process is driven LEDs, and the output is the illumination from the LEDs.

Figure 16:
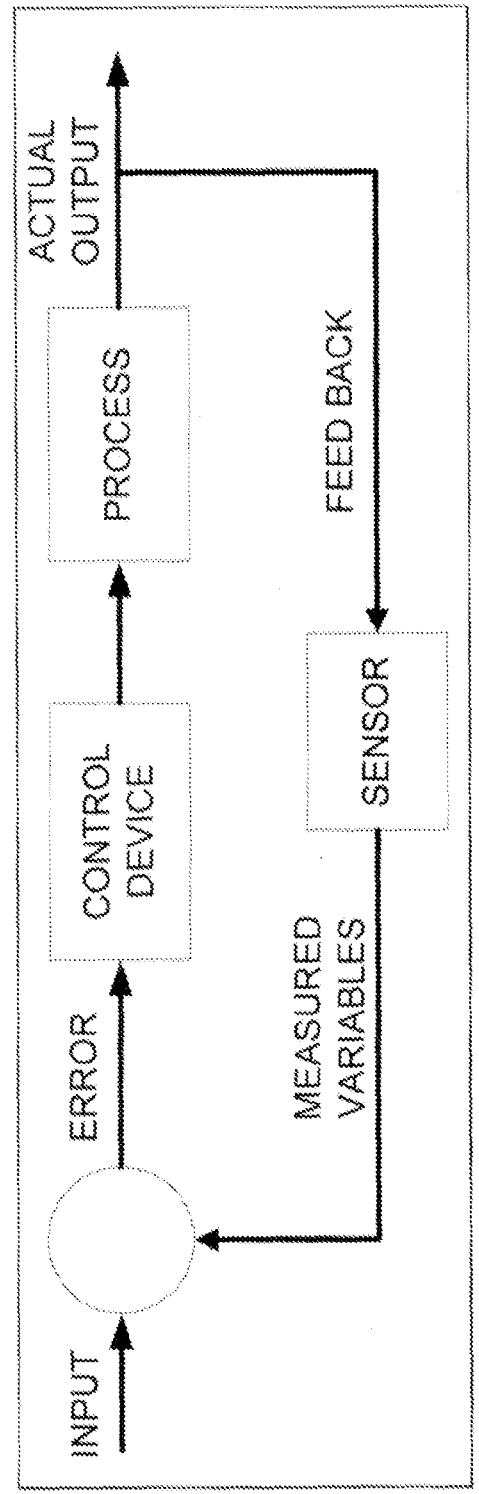
FIG. 16 is an exemplary closed loop color balancing system.

FIG. 16 shows that another embodiment of the invention that may further comprise a color sensitive device with temperature compensation and variable gain. The color sensitive device, as the sensor, exposed to RGB light, as the output of the process, may generate red-light, green-light and blue-light detection currents corresponding to the illumination of RGB light via a P-N interface of RGB photodiodes. The red-light, green-light and blue-light detection currents may be transformed into voltage signals, which may be magnified via a variable resister external to the color sensitive device from the sensor block. In addition, the color sensitive device may include a temperature compensation circuit, as part of the control device block, for adjusting the non-ideal characteristics of photodiodes as well as LEDs, so that a color display system using the color sensitive device may achieve a white balance point, i.e., using that point as the reference point input, after receiving the RGB voltage signals.

With a traditional form factor limitation of numbers of LED, current driven power produced may be limited by the junction temperature of the LED. An LED is sensitive to temperature. With increased temperature, the LED life is limited and may cause premature failure and/or color shift. A metal core LED board may be mounted on a light fixture to transfer heat from the LEDs to a metal fixture body. The LED board may also include a plastic enclosure 1721 to protect the driver circuitry 1722 that might otherwise be in inadvertent contact with the metal enclosure. FIGS. 17A-17D depict an embodiment of an LED-based lighting fixture. FIG. 17A depicts, in a perspective view, an exemplary lighting fixture 1700. FIG. 17B depicts in a perspective views an LED board 1710 mounted to the frustoconical-shaped flange 1720 that is made of heat conductive material such as metal, e.g., aluminum. FIG. 17C depicts in cross-sectional side view an assembly comprising an LED-based light source, such as an LED circuit board 1710, mounted with a housing having side walls 1720 in thermal communication. FIG. 17D depicts in a cross-sectional side view the fixture of FIG. 17A where an LED-based light source, such as an LED circuit board 1710, may be mounted with a housing having side walls 1720 in thermal communication with a base portion 1730 of the fixture 1700. Accordingly, a lighting fixture base 1730, also made of thermal conductive material, serves as a heat sink and accordingly protects the LED driver circuits from heat failure.

Figure 18A:
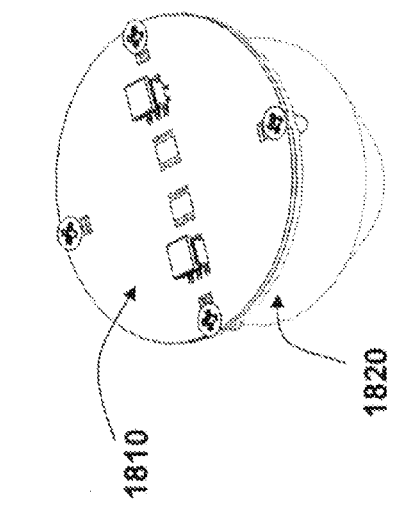
FIG. 18A-18F depict an exemplary light fixture configured to receive an LED module.
Figure 18B:
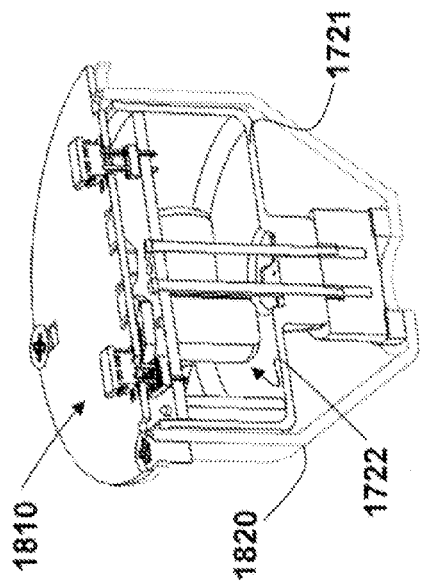
Figure 18C:
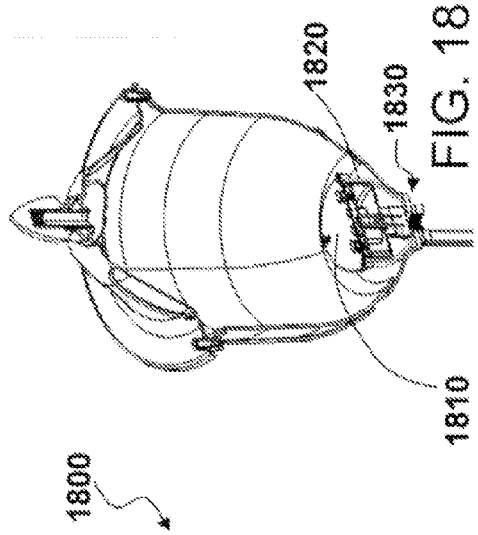
Figure 18D:
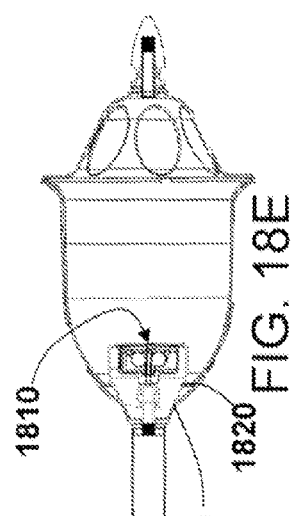
Figure 18E:
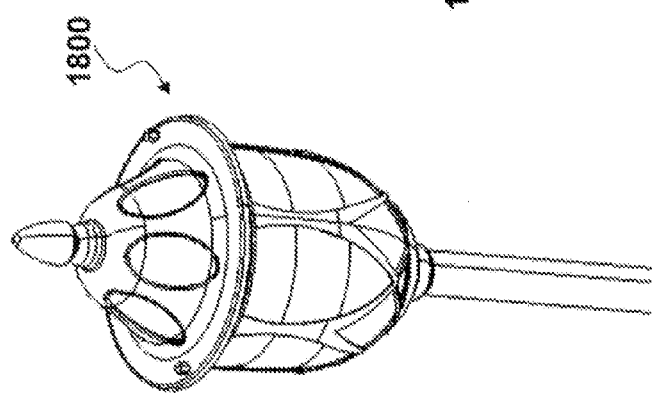
Figure 18F:
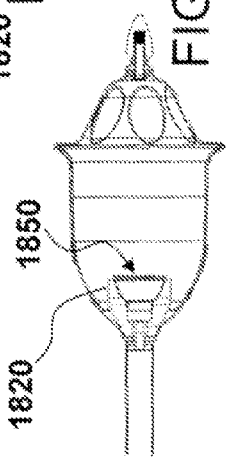

FIGS. 18A-18F represent another embodiment of an LED-based lighting fixture. FIG. 18A depicts, in a perspective view, an exemplary lighting fixture 1800. FIG. 18B depicts in a perspective view an assembly comprising an LED circuit board 1810 and bowl-shaped housing 1820. FIG. 18C depicts in a cross-sectional side view the LED circuit board 1810, mounted with a housing 1820. FIGS. 18D and 18E depict in a cross-sectional side views the fixture of FIG. 18A where the LED-based light source, such as an LED circuit board 1810, may be mounted with a housing having side walls 1820 in thermal communication with a base portion 1830 of the fixture 1800. Accordingly, a lighting fixture base 1830, also made of thermal conductive material, serves as a heat sink and accordingly protects the LED driver circuits from heat failure. FIG. 18F depicts in a cross-sectional side view the fixture of 18A where a light-emitting element such as an MR16 halogen light bulb 1850 is inserted and place in thermal communication with the fixture.

Embodiments of the invention are envisioned to be emitted with light emitting devices, such as LEDs or organic LEDs (OLEDs).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:
1. A lighting system comprising:
a master controller comprising a microcontroller, and a power line polarity switching unit configured to control a level of direct current from a direct current source to one or more slave control units via a first power line of a direct current (DC) circuit having a voltage polarity and a second power line of the DC circuit having a voltage polarity opposite the polarity of the first power line, the master controller configured to communicate with the one or more slave control units via switching the voltage polarities of the first power line and the second power line as a unidirectional communication system, wherein the master controller communicates to the one or more slave control units an intended action that is to be executed by the one or more slave control units and wherein the line polarity switching unit of the master control comprises a single H-bridge circuit in order for the master control to communicate to a plurality of slave control units.

2. The lighting system of claim 1 further comprising one or more slave control units wherein at least one of the slave control units comprises a polarity detecting module and a slave microcontroller configured to set a mode of operation based on a series of detected polarities of the direct current of at the first power line.

3. The light system of claim 1 wherein the polarity detecting module of the at least one slave control unit comprises a switching transistor in communication with the slave microcontroller and the first power line.

4. The lighting system of claim 1 wherein the at least one of the slave control units further comprises an LED driver circuit and at least one LED.

5. The lighting system of claim 1 wherein the at least one of the slave control units is configured to emit light to indicate a slave control unit selection.

6. The lighting system of claim 1 wherein the at least one of the slave control units is configured to power off based on a temperature threshold.

7. The lighting system of claim 1 wherein the at least one of the slave control units further comprises at least one temperature sensor in electrical communication with the microcontroller, wherein the microcontroller is further configured to adjust intensity of a light source of the at least one slave control unit having the at least one temperature sensor.

8. The lighting system of claim 1 wherein the time series of the voltage polarities of the first power line and the second power line is based on a predetermined binary command code.

9. The lighting system of claim 8 wherein the predetermined binary command code comprises a start code for instructing the destination electronic device to initiate an action selected from the group comprising at least one of: assigning one or more addresses to the destination electronic device; saving a user-defined color sequence; selecting a factory preset color sequence; and synchronizing timing between two or more destination electronic devices.

10. The lighting system of claim 1 wherein the time series of the voltage polarities of the first power line and the second power line is based on a predetermined binary address code.

11. The lighting system of claim 2 wherein at least one slave control unit further comprises a color temperature adjustable LED array further comprising at least one of: a red drive circuit; a green drive circuit, and a blue drive circuit wherein each drive circuit is configured to supply a drive current to its respective LED.

12. The lighting system of claim 11 wherein the master controller is further configured to synchronize color temperature for the one or more slave control units.

13. A method of communicating between a source electronic device and a destination electronic device via a direct current circuit comprising:
switching direct current (DC) line polarity of a DC circuit comprising a first line and a second line, based on high voltage signals and low voltage signals at the source electronic device and wherein the polarity switching is effected by a single H-bridge in order for the source electronic device to communicate to a plurality of destination electronic devices;
providing the first line to a polarity detector;
receiving, at the destination electronic device, high voltage signals and low voltage signals based on the detected polarity; and
executing, at the destination electronic device, an intended action based on a unidirectional communication system wherein the source electronic device communicates the intended action to the destination electronic device to control lighting produced by the destination electronic device.

14. The method of claim 13 further comprising the step of:
effecting mode state changes at the destination electronic device based on a series of received high signals and low signals.

15. The method of claim 14 wherein in the polarity detection is effected by a switching transistor in communication with the first line.

16. The method of claim 13 wherein the polarity switching is based on a predetermined binary command code.

17. The method claim of 16 wherein the predetermined binary command code comprises a start code for instructing the destination electronic device to initiate an action selected from the group comprising at least one of: assigning one or more addresses to the destination electronic device; saving a user-defined color sequence; selecting a factory preset color sequence; and synchronizing timing between two or more destination electronic devices.

18. The method of claim 13 wherein the polarity switching is based on a predetermined binary address code.

19. A lighting system comprising:
a master controller comprising a microcontroller, and a power line polarity switching unit configured to control a level of direct current from a direct current source to one or more slave control units via a first power line of a direct current (DC) circuit having a voltage polarity and a second power line of the DC circuit having a voltage polarity opposite the polarity of the first power line, the master controller configured to communicate with the one or more slave control units via switching the voltage polarities of the first power line and the second power line as a unidirectional communication system, wherein the master controller communicates to the one or more slave control units an intended action that is to be executed by the one or more slave control units and wherein the time series of the voltage polarities of the first power line and the second power line is based on a predetermined binary command code, the predetermined binary command code comprising a start code for instructing the destination electronic device to initiate an action selected from the group comprising: assigning one or more addresses to the destination electronic device.

* * * * *